(12) United States Patent
Sager

(10) Patent No.: US 12,195,968 B2
(45) Date of Patent: *Jan. 14, 2025

(54) FILTERING MESH WITH GROWTH INHIBITING MATERIAL

(71) Applicant: Karen M. Sager, Ridgewood, NJ (US)

(72) Inventor: Karen M. Sager, Ridgewood, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/251,286

(22) Filed: Jan. 18, 2019

(65) Prior Publication Data

US 2019/0153730 A1 May 23, 2019

Related U.S. Application Data

(63) Continuation-in-part of application No. 13/336,448, filed on Dec. 23, 2011, now Pat. No. 10,538,920.

(60) Provisional application No. 62/673,735, filed on May 18, 2018.

(51) Int. Cl.
*E04D 13/00* (2006.01)
*C02F 3/00* (2023.01)
*E04D 13/076* (2006.01)
*C02F 1/00* (2023.01)
*E04D 13/04* (2006.01)
*E04D 13/08* (2006.01)

(52) U.S. Cl.
CPC ......... *E04D 13/076* (2013.01); *E04D 13/002* (2013.01); *C02F 1/003* (2013.01); *C02F 3/00* (2013.01); *E04D 2013/0413* (2013.01); *E04D 2013/086* (2013.01)

(58) Field of Classification Search
CPC ............ E04D 13/04; E04D 2013/0413; E04D 13/0445; E04D 2013/0486; E04D 13/1767
See application file for complete search history.

(56) References Cited

U.S. PATENT DOCUMENTS

| 3,696,373 A | * | 10/1972 | Dunn | G08B 13/126 52/664 |
| 4,146,293 A | * | 3/1979 | Mutton | G08B 13/126 340/545.8 |
| 4,418,504 A | * | 12/1983 | Lassiter | E04D 13/076 210/474 |

(Continued)

FOREIGN PATENT DOCUMENTS

| CN | 101954224 A | * | 1/2011 |
| CN | 102458606 A | * | 5/2012 |

(Continued)

OTHER PUBLICATIONS https://vlr.eng.br/pinocho-cuento/how-to-clarify-stock-to-create-a-better-tasting-ww-38448305 (Year: 2023).*

*Primary Examiner* — Phi D A

(74) *Attorney, Agent, or Firm* — MH2 TECHNOLOGY LAW GROUP LLP; Stuart I. Smith

(57) ABSTRACT

A filtration device is provided for filtering a liquid that passes over the filtration device. The device includes a screen through which the liquid can pass, the screen having a top side, a bottom side, and a plurality of threads, at least a portion of the plurality of threads being a first material; and a growth inhibiting element that is one of attached to and a part of the screen, the growth inhibiting element being a second material. The second material and the first material are different materials.

22 Claims, 30 Drawing Sheets

(56) References Cited

U.S. PATENT DOCUMENTS

| | | | | |
|---|---|---|---|---|
| 4,586,030 A | * | 4/1986 | Klostermann | G08B 13/122 250/221 |
| 4,676,485 A | * | 6/1987 | Ciordinik | G08B 13/124 256/12 |
| 4,814,750 A | * | 3/1989 | Abramson | G08B 13/126 340/550 |
| 4,959,932 A | * | 10/1990 | Pfeifer | E04D 13/076 52/12 |
| 5,038,530 A | * | 8/1991 | Watkins | E04D 13/076 52/63 |
| 5,049,855 A | * | 9/1991 | Slemon | G08B 13/126 340/550 |
| 5,526,612 A | * | 6/1996 | Wade | E04D 13/0645 210/474 |
| 5,677,674 A | * | 10/1997 | Wolf | B60R 25/00 340/541 |
| 5,729,931 A | * | 3/1998 | Wade | E04D 13/076 52/12 |
| 6,134,843 A | * | 10/2000 | Tregear | E04D 13/076 52/12 |
| 6,215,397 B1 | * | 4/2001 | Lindskog | E05G 1/005 109/42 |
| 6,514,324 B1 | * | 2/2003 | Chapman | B03C 3/28 55/528 |
| 6,598,352 B2 | | 7/2003 | Higginbotham | |
| 6,951,077 B1 | * | 10/2005 | Higginbotham | E04D 13/076 52/12 |
| 7,112,274 B1 | * | 9/2006 | Sanguinetti | B01D 29/01 210/163 |
| 7,174,688 B2 | | 2/2007 | Higginbotham | |
| 7,191,564 B2 | | 3/2007 | Higginbotham | |
| D565,706 S | * | 4/2008 | Murray | D23/261 |
| 7,352,284 B2 | * | 4/2008 | Krill | G08B 13/12 340/540 |
| 7,455,766 B1 | * | 11/2008 | Lewis | E03F 1/00 210/163 |
| 7,584,577 B2 | * | 9/2009 | Esmond | E04D 13/08 210/251 |
| 7,913,458 B2 | | 3/2011 | Higginbotham | |
| 7,919,002 B1 | * | 4/2011 | Hurtado | E04D 13/08 210/747.2 |
| 8,006,438 B2 | | 8/2011 | Higginbotham | |
| RE42,896 E | | 11/2011 | Higginbotham | |
| RE43,555 E | | 7/2012 | Higginbotham | |
| 8,276,321 B2 | * | 10/2012 | Bell | E04D 13/0725 52/12 |
| 8,312,677 B2 | | 11/2012 | Higginbotham | |
| 8,397,436 B2 | | 3/2013 | Higginbotham | |
| 8,475,657 B2 | * | 7/2013 | Wu | A01K 63/045 210/167.22 |
| 8,528,262 B2 | * | 9/2013 | Horton | E04D 13/0725 52/12 |
| 9,010,029 B2 | | 4/2015 | Higginbotham | |
| 2002/0152691 A1 | * | 10/2002 | Wade | E04D 13/08 52/11 |
| 2003/0046876 A1 | * | 3/2003 | Higginbotham | E04D 13/076 52/11 |
| 2004/0031222 A1 | | 2/2004 | Porat | |
| 2004/0232057 A1 | * | 11/2004 | Orozco | E03F 5/0404 210/86 |
| 2005/0257432 A1 | * | 11/2005 | Higginbotham | E04D 13/076 52/12 |
| 2006/0248805 A1 | | 11/2006 | Gentry | |
| 2007/0055007 A1 | | 3/2007 | Pagel et al. | |
| 2007/0068092 A1 | | 3/2007 | Fraser, Jr. | |
| 2009/0000210 A1 | * | 1/2009 | Barnett | E04D 13/076 52/12 |
| 2009/0236273 A1 | * | 9/2009 | Esmond | E04D 13/08 210/155 |
| 2009/0288349 A1 | | 11/2009 | Wootton | |
| 2010/0251626 A1 | | 10/2010 | Roque Alonso | |
| 2010/0287846 A1 | * | 11/2010 | Lenney | E04D 13/0762 52/12 |
| 2011/0252723 A1 | | 10/2011 | Devery | |
| 2011/0308557 A1 | | 12/2011 | Kaiser | |
| 2013/0097943 A1 | * | 4/2013 | Higginbotham | E04D 13/064 52/12 |
| 2013/0145699 A1 | * | 6/2013 | Olthoff | E04D 13/076 52/12 |
| 2017/0145697 A1 | * | 5/2017 | Anthony | E04D 13/15 |
| 2019/0153730 A1 | * | 5/2019 | Sager | E04D 13/002 |
| 2019/0224937 A1 | * | 7/2019 | Fanelli | B32B 1/08 |
| 2021/0154610 A1 | * | 5/2021 | Carredo | B32B 15/095 |

FOREIGN PATENT DOCUMENTS

| | | | |
|---|---|---|---|
| CN | 107213789 A | * | 9/2017 |
| KR | 20210144604 A | * | 10/2021 |

* cited by examiner

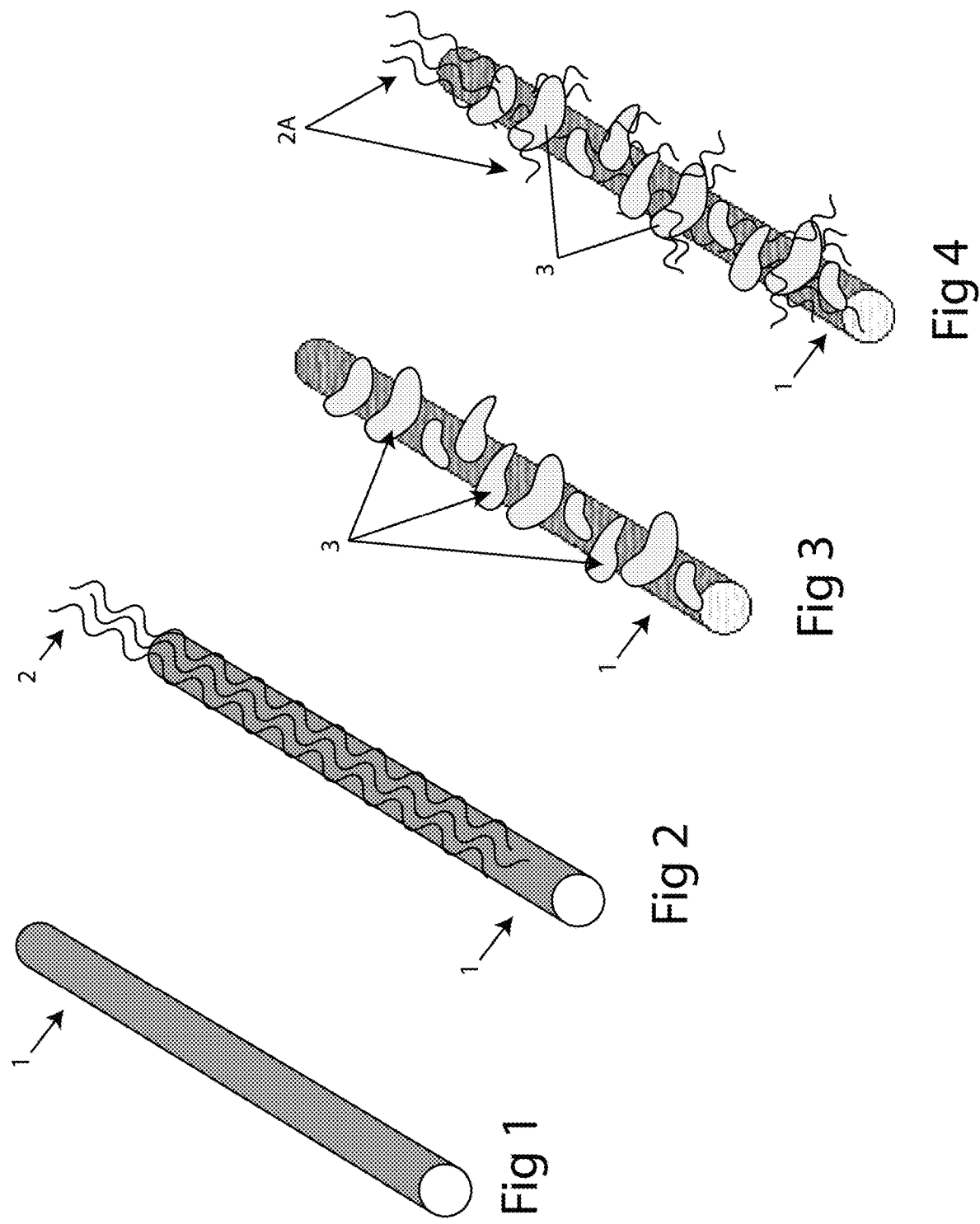

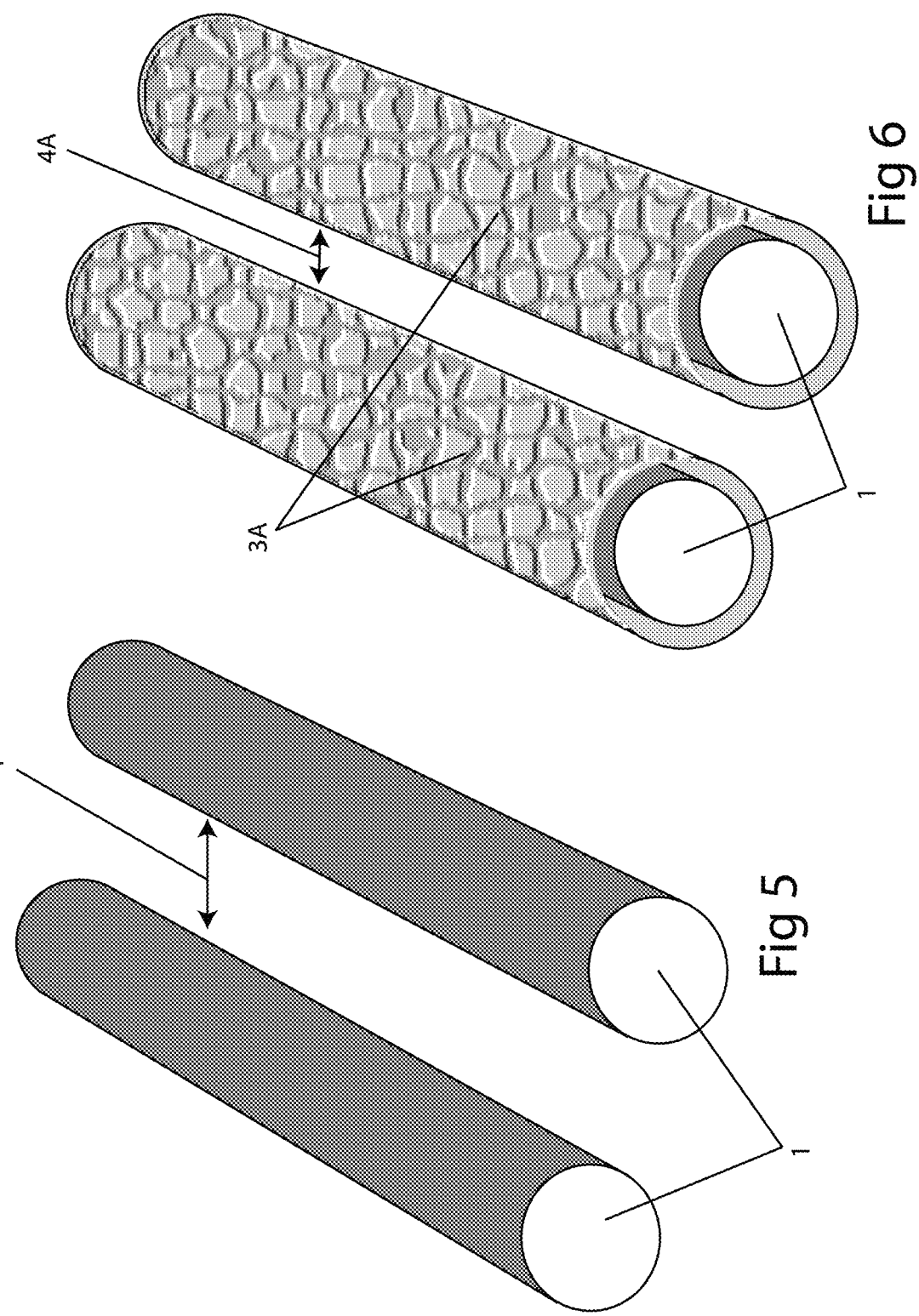

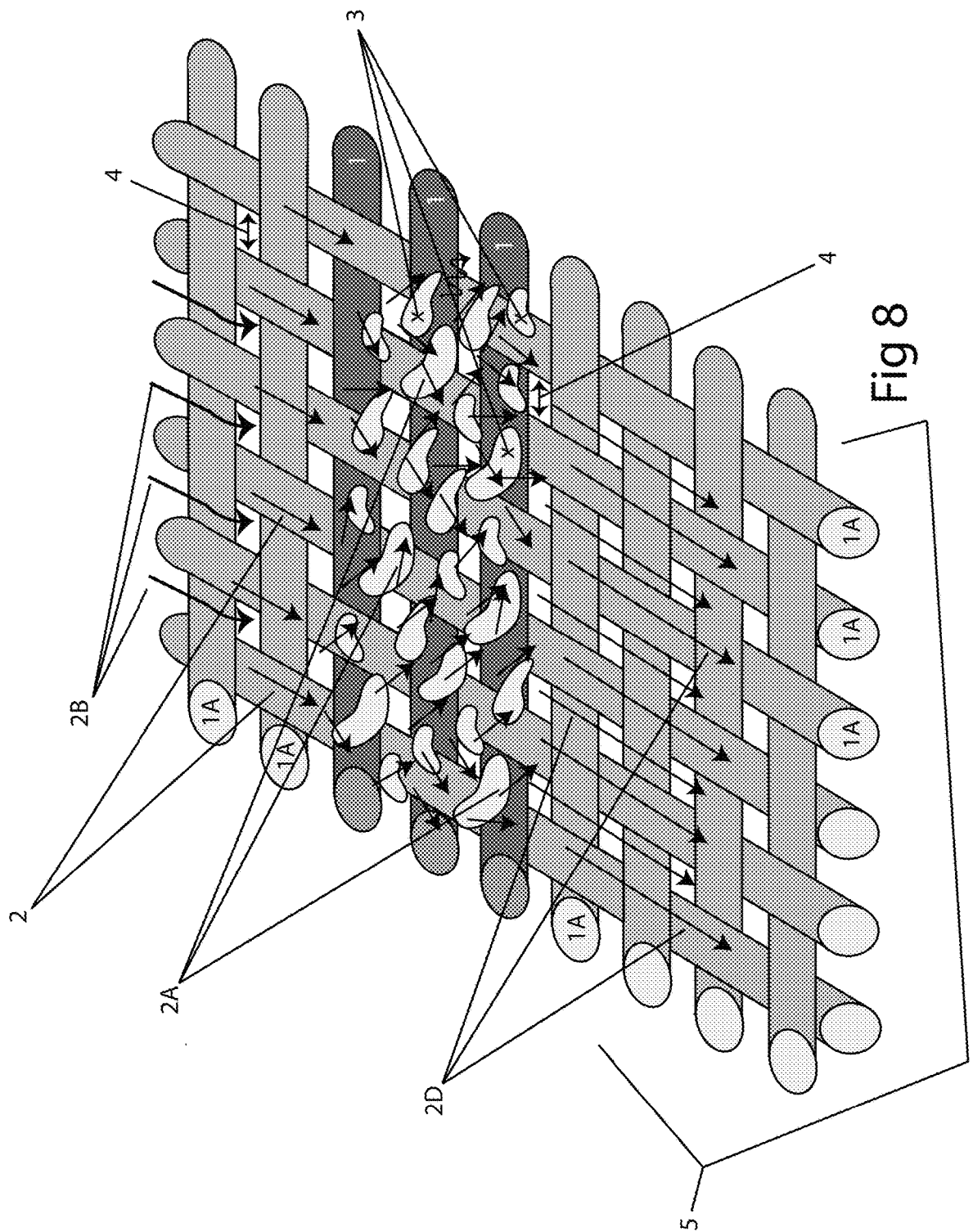

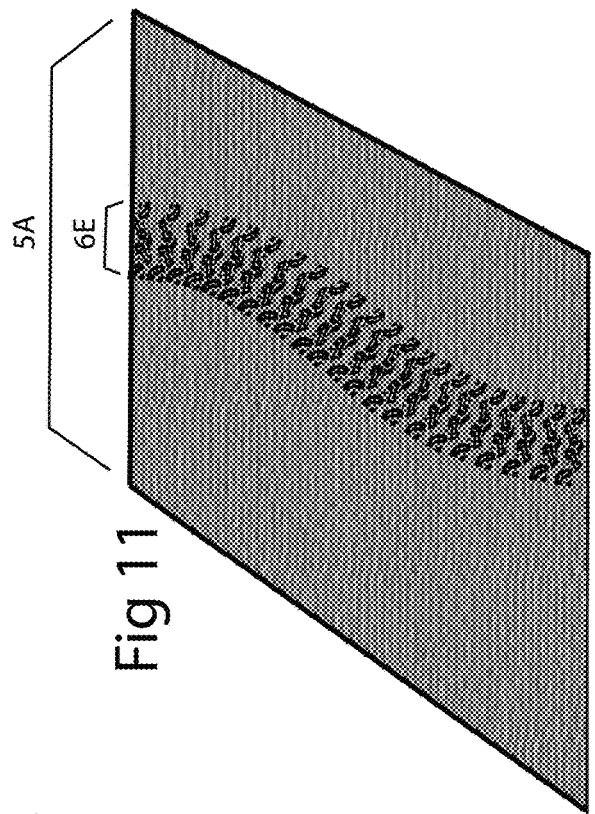
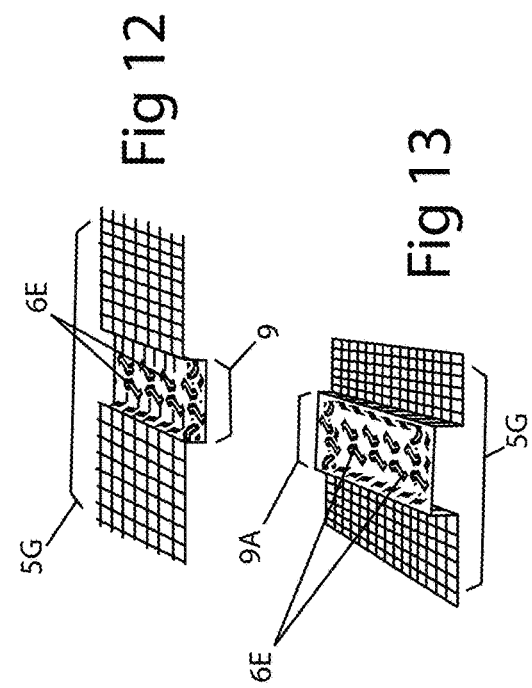
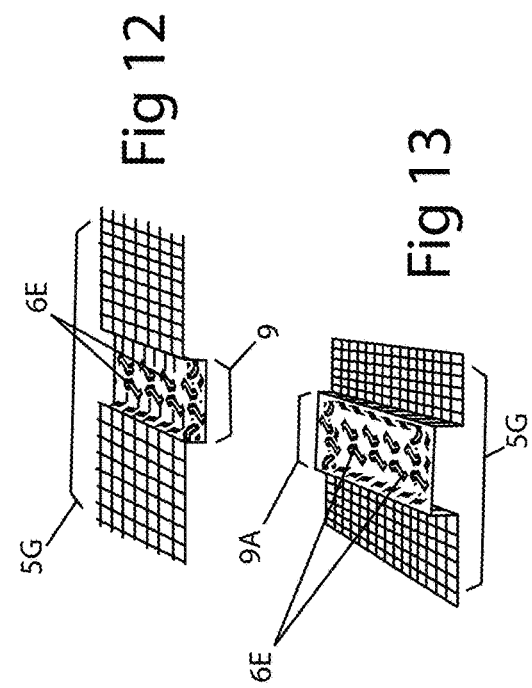
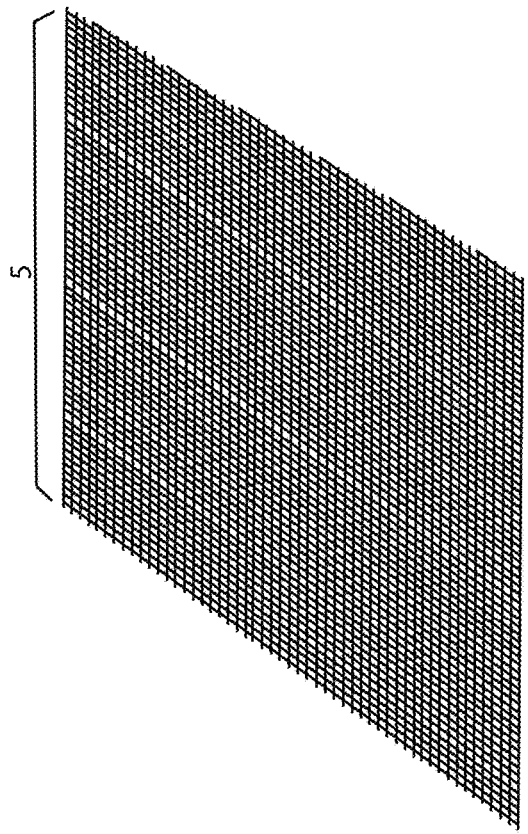
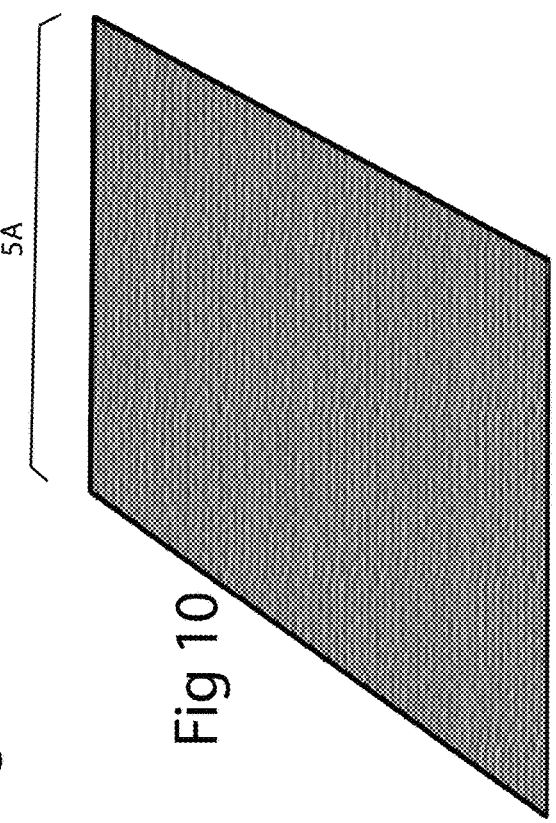
Fig 9
Fig 10
Fig 11
Fig 12
Fig 13

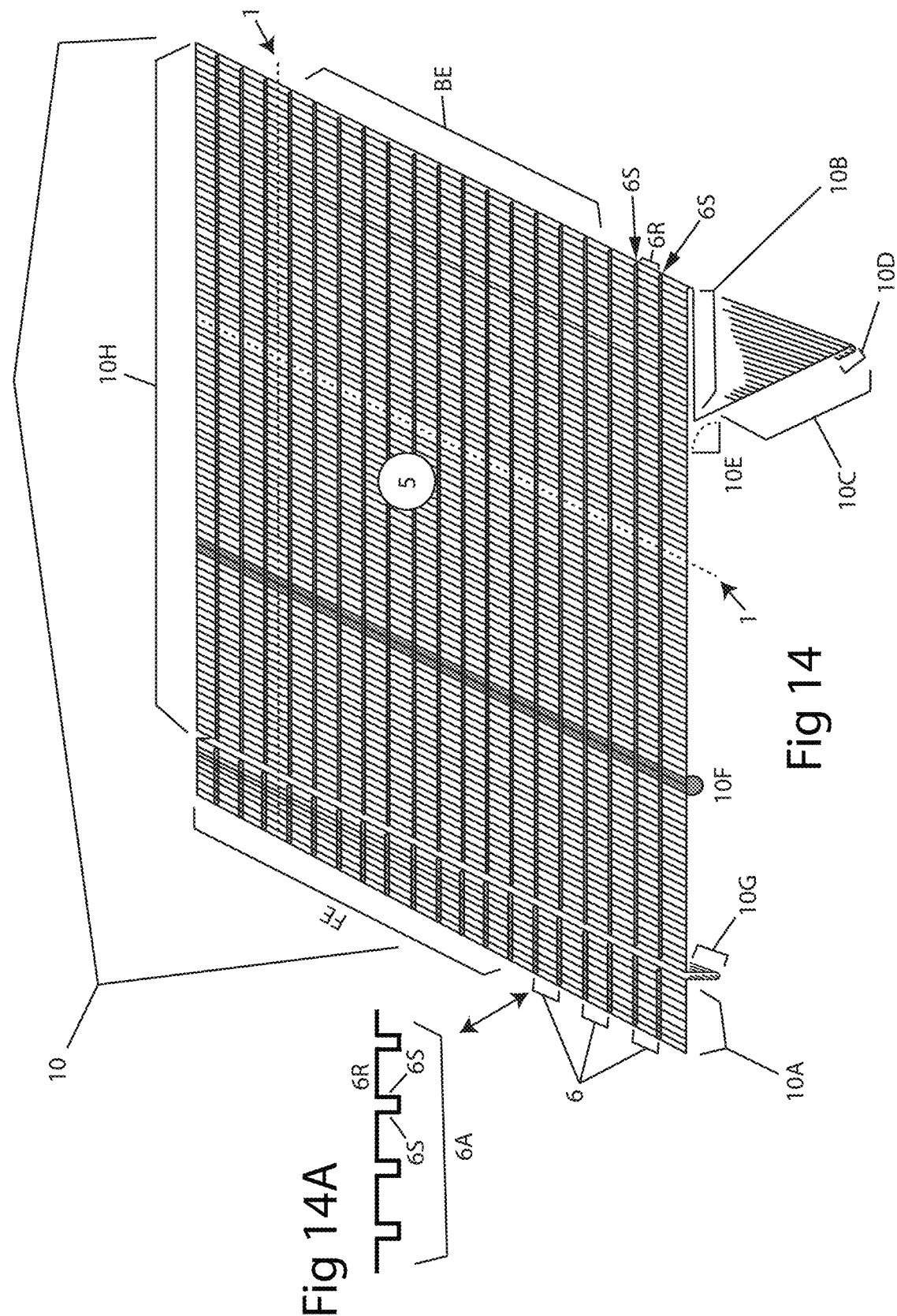

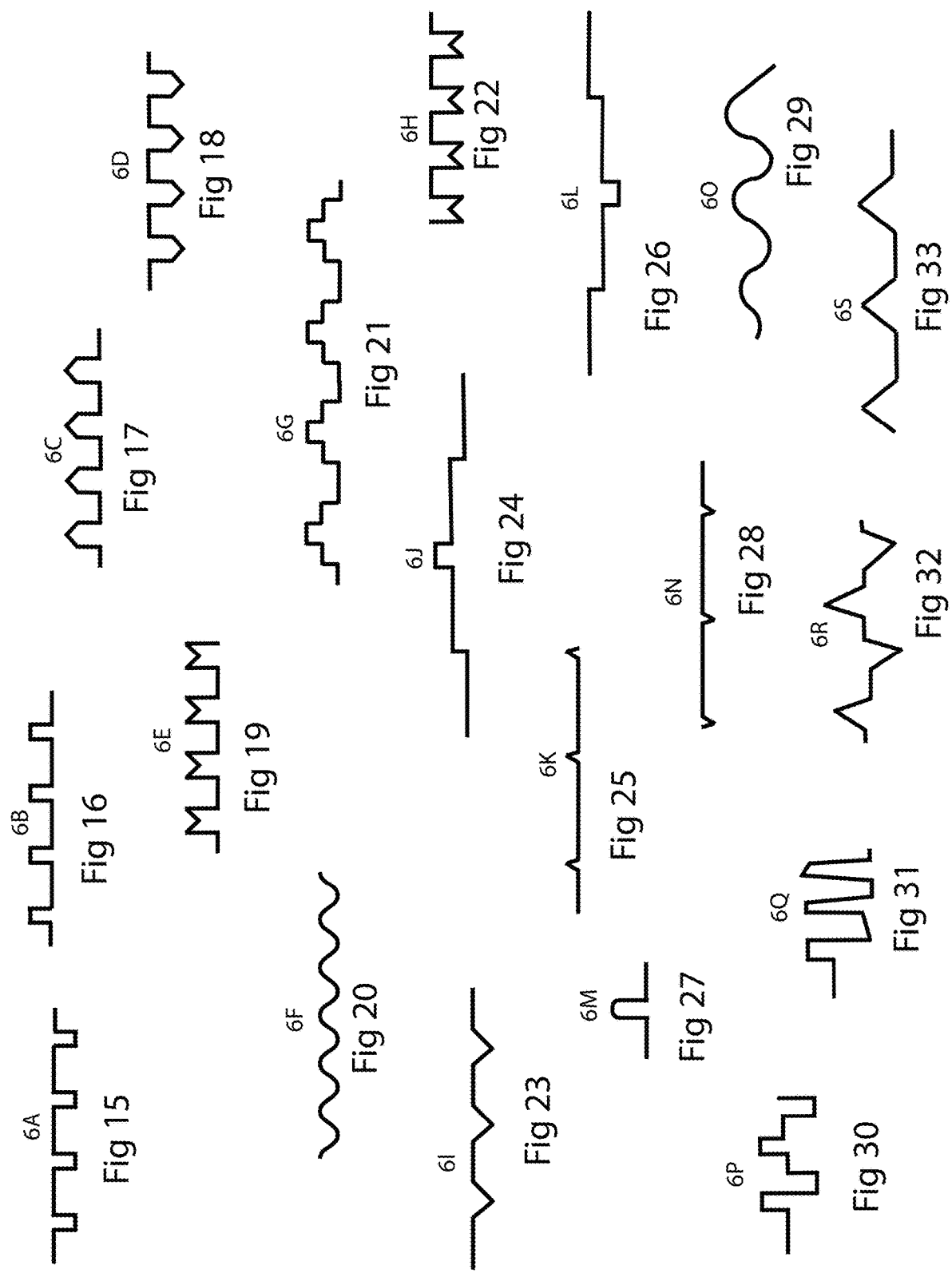

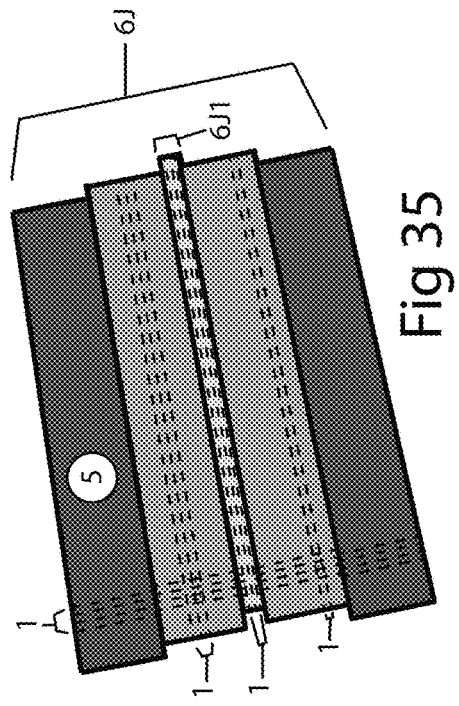
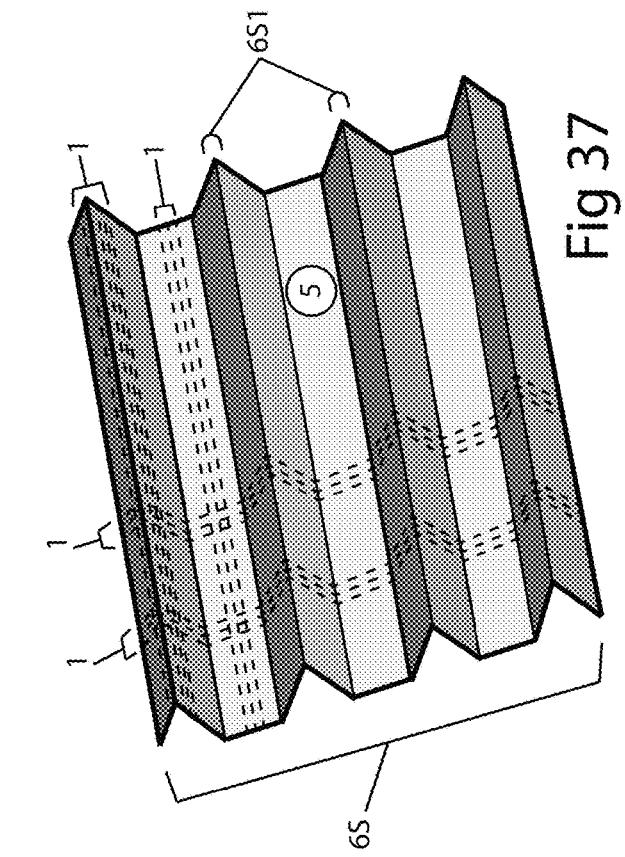
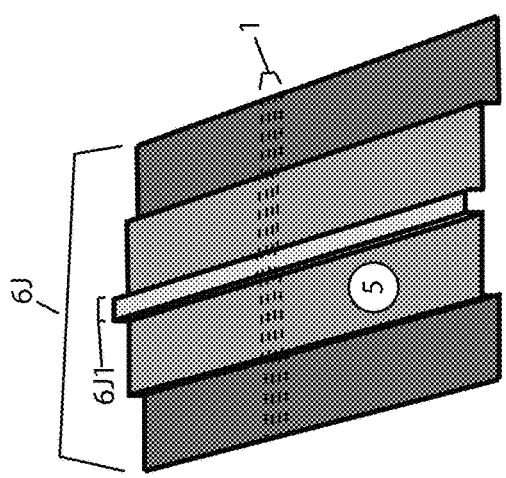
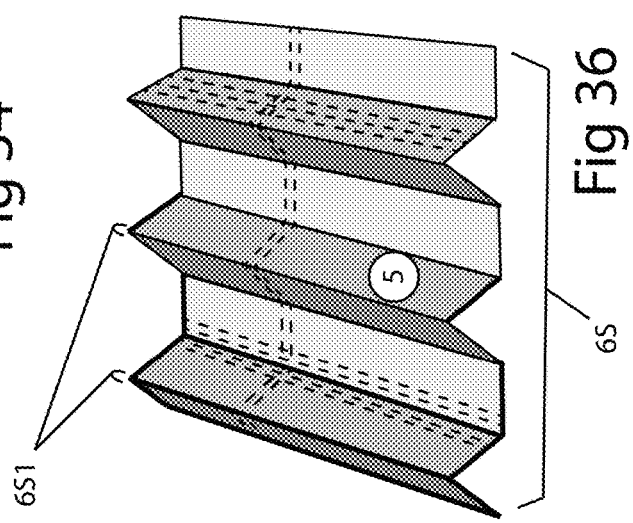

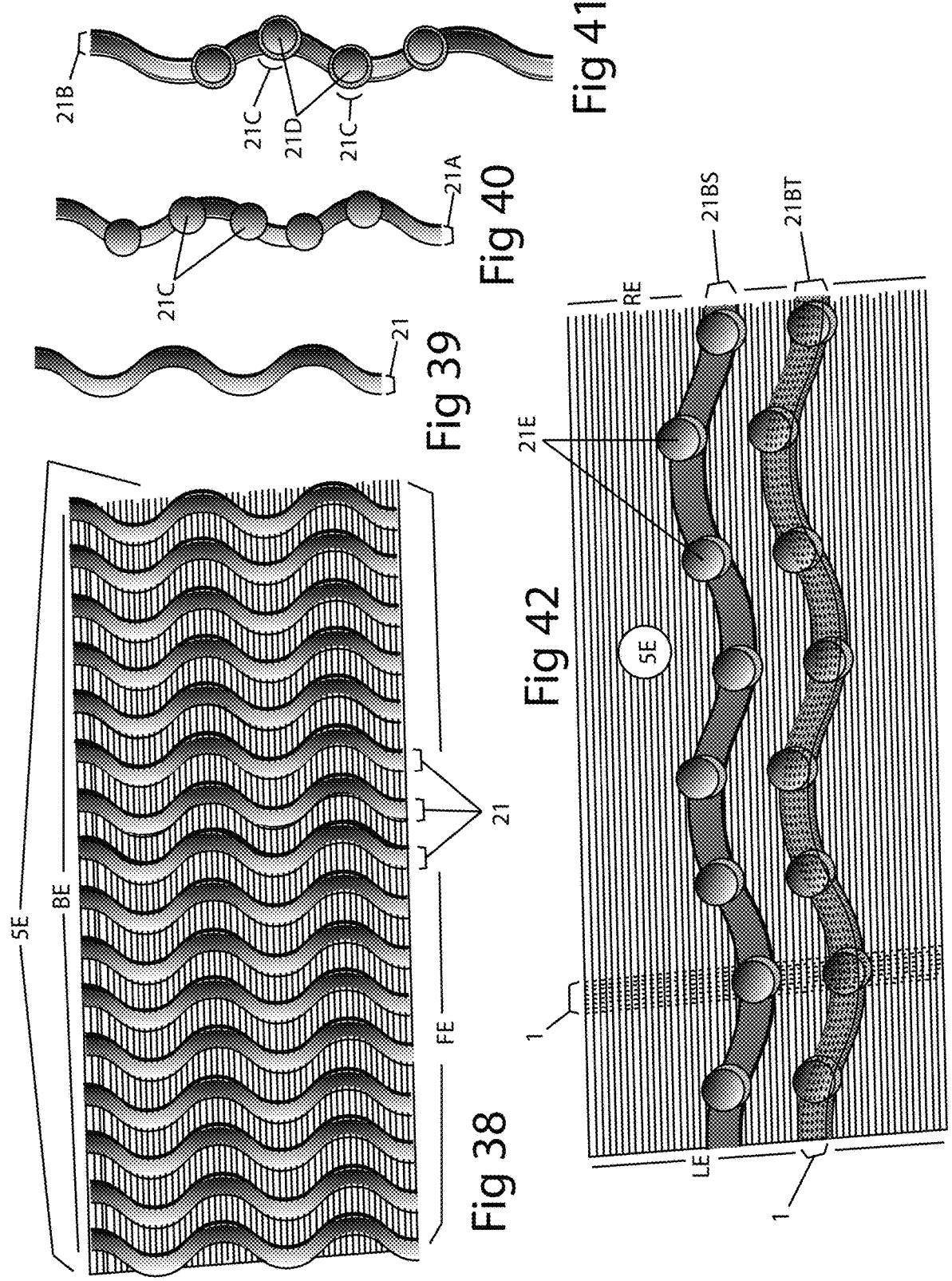

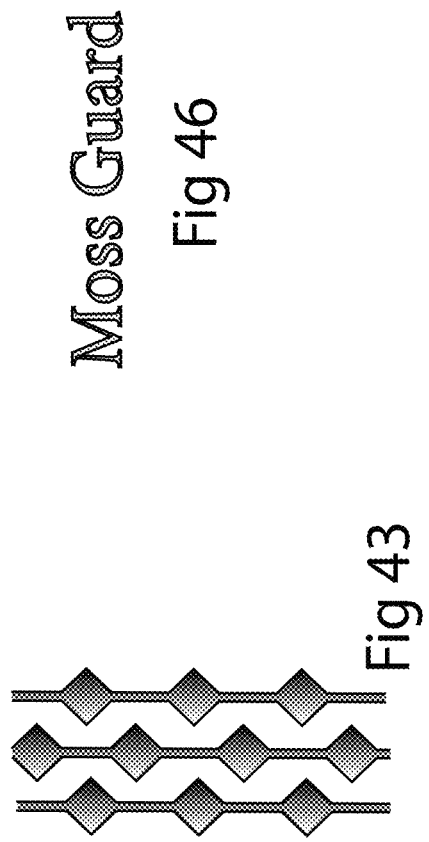
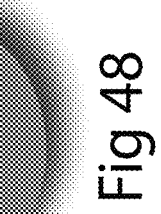
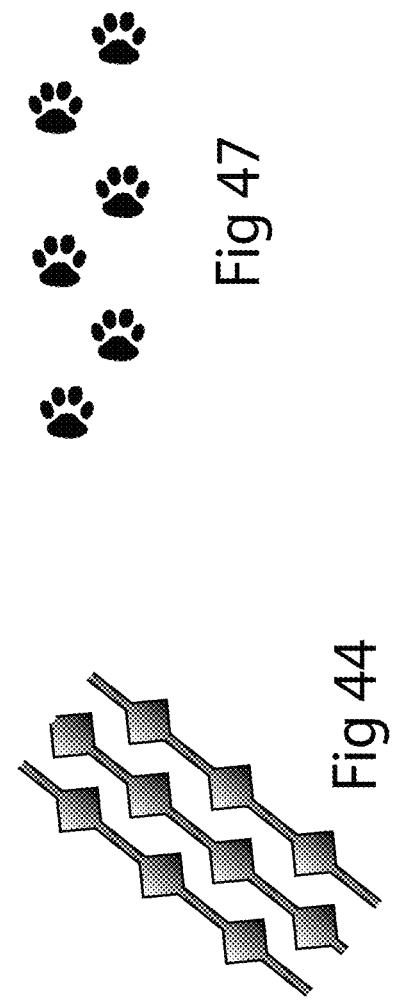
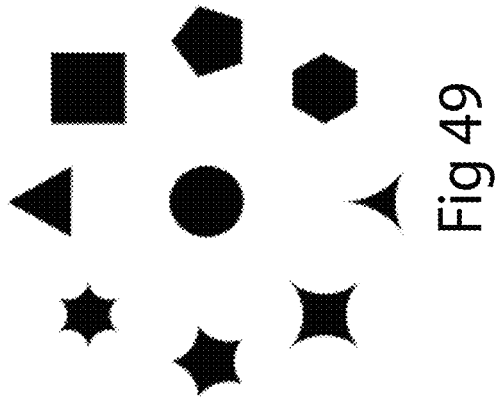
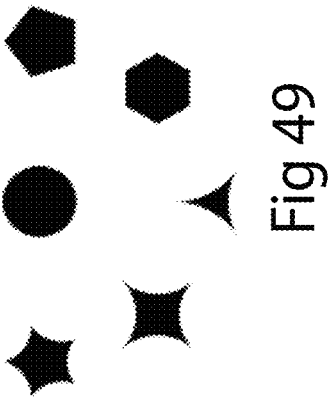
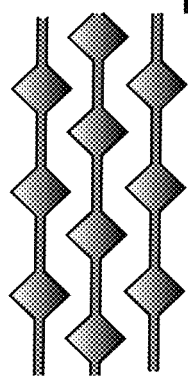
Fig 43
Fig 44
Fig 45
Fig 46
Fig 47
Fig 48
Fig 49

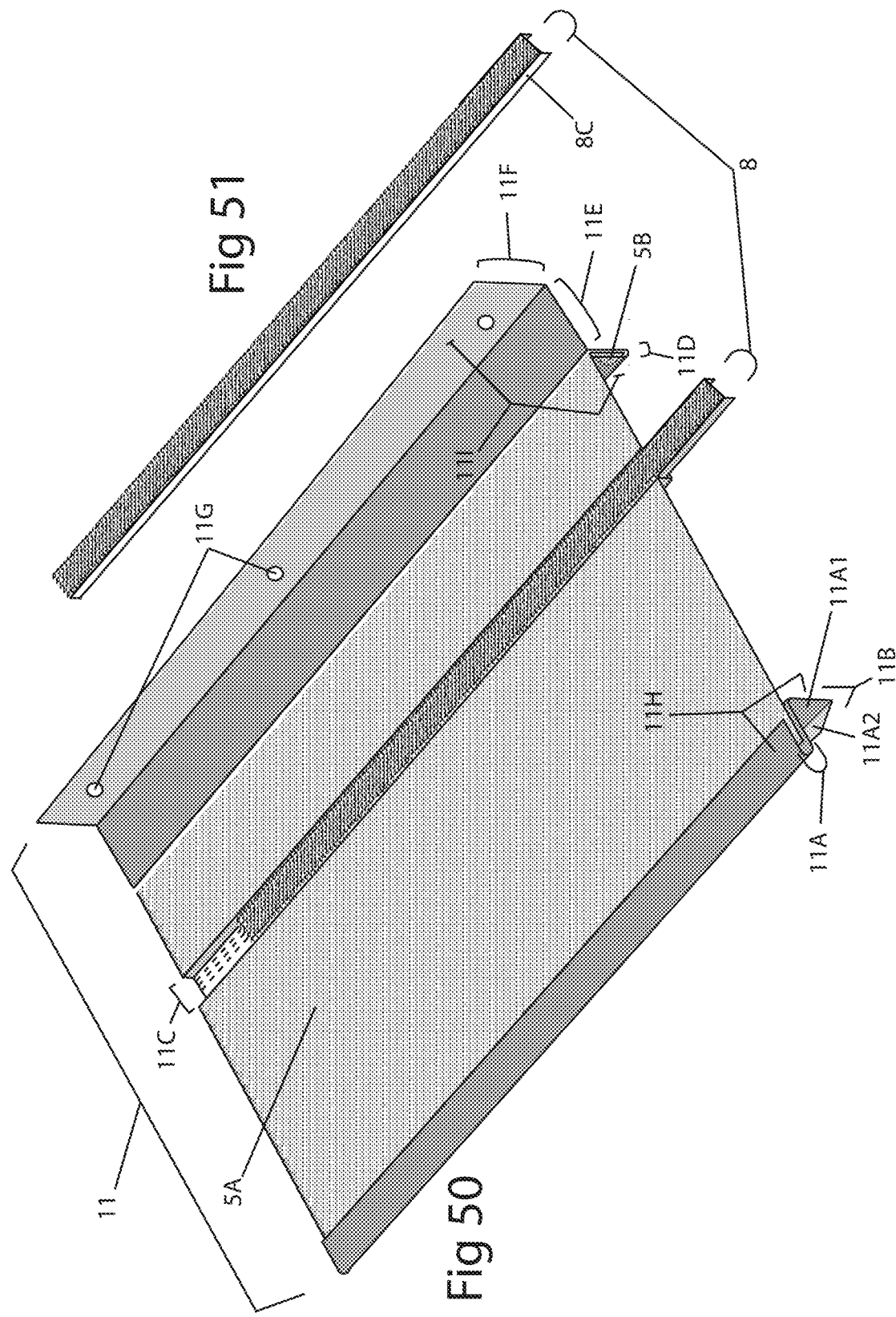

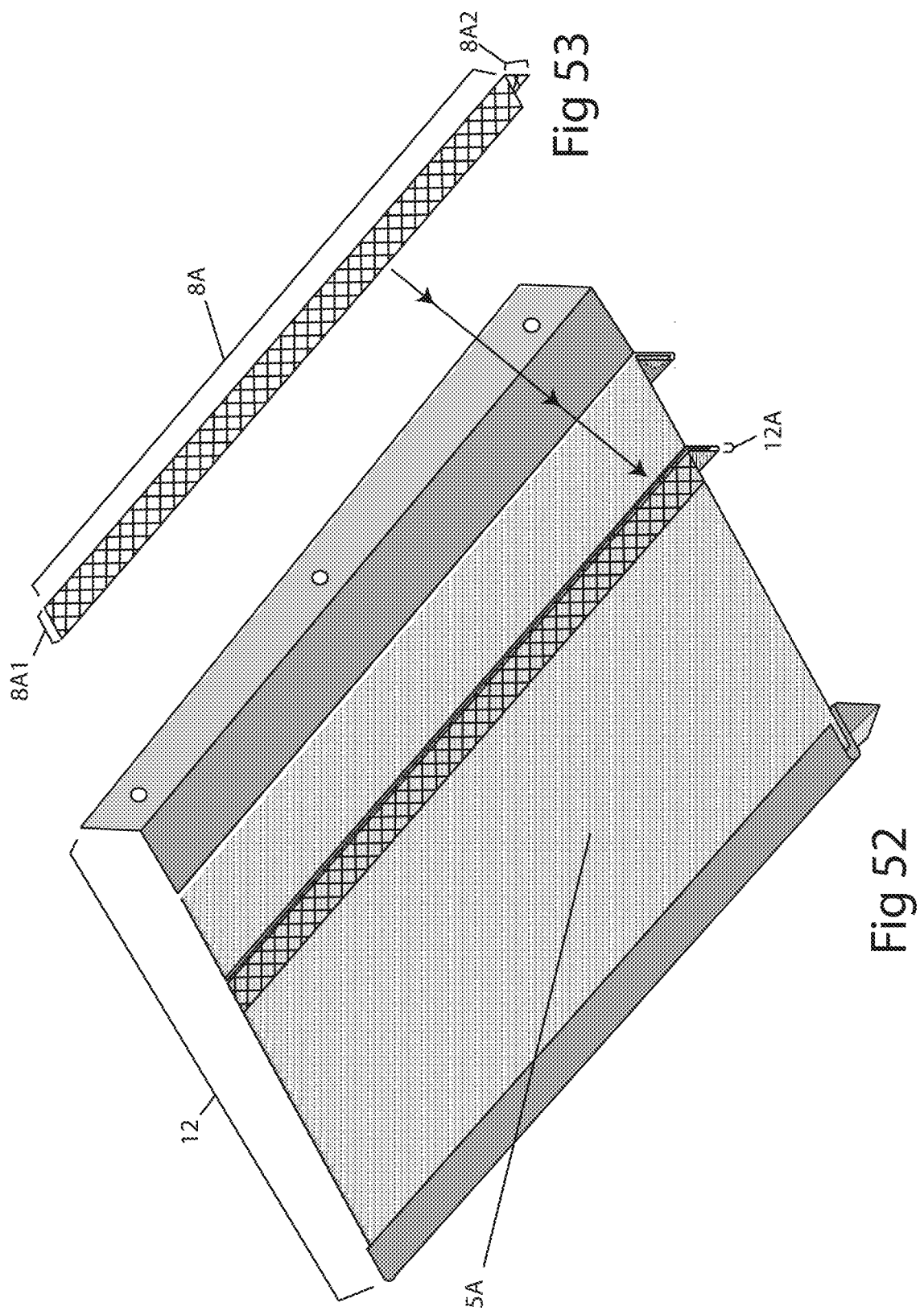

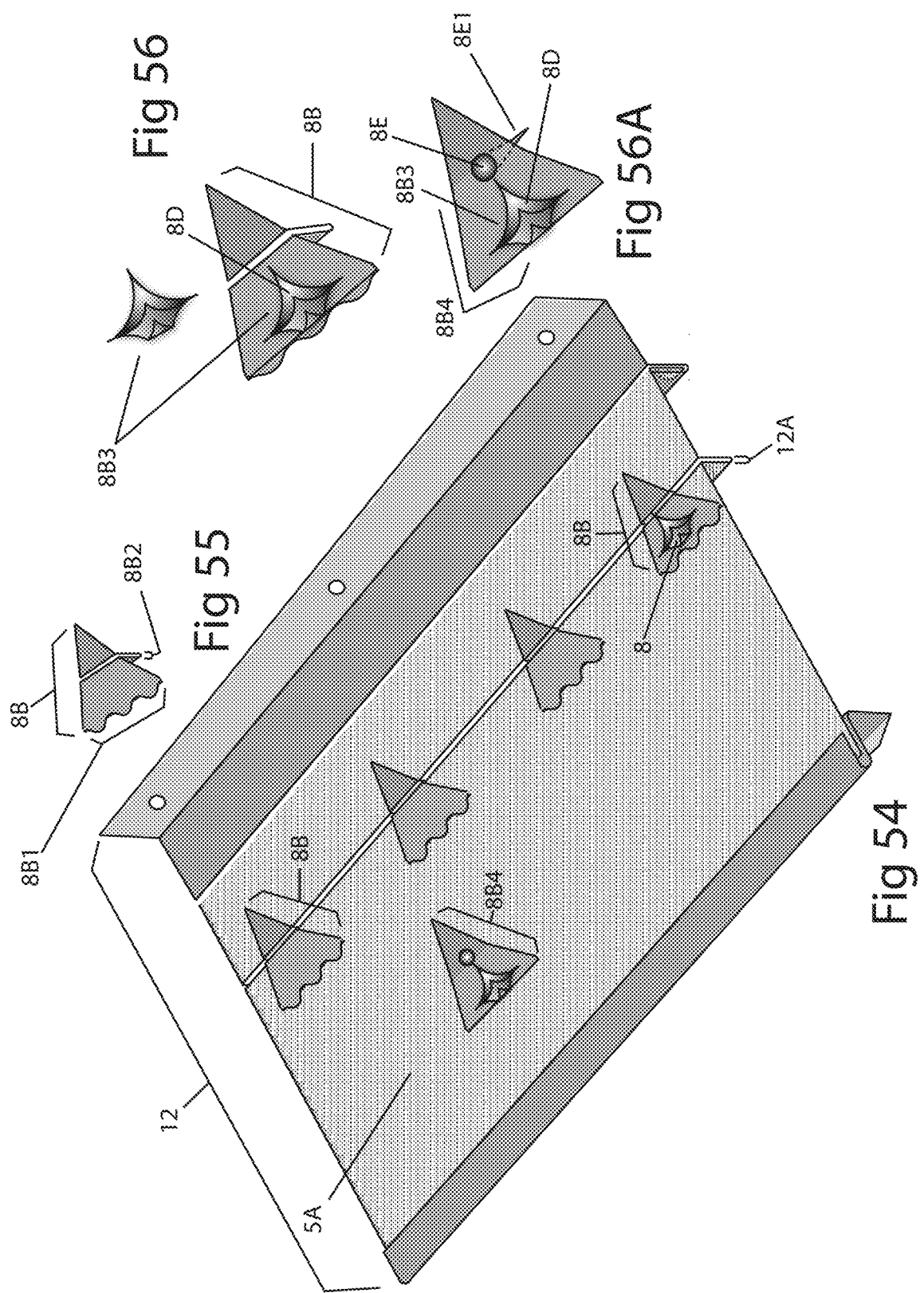

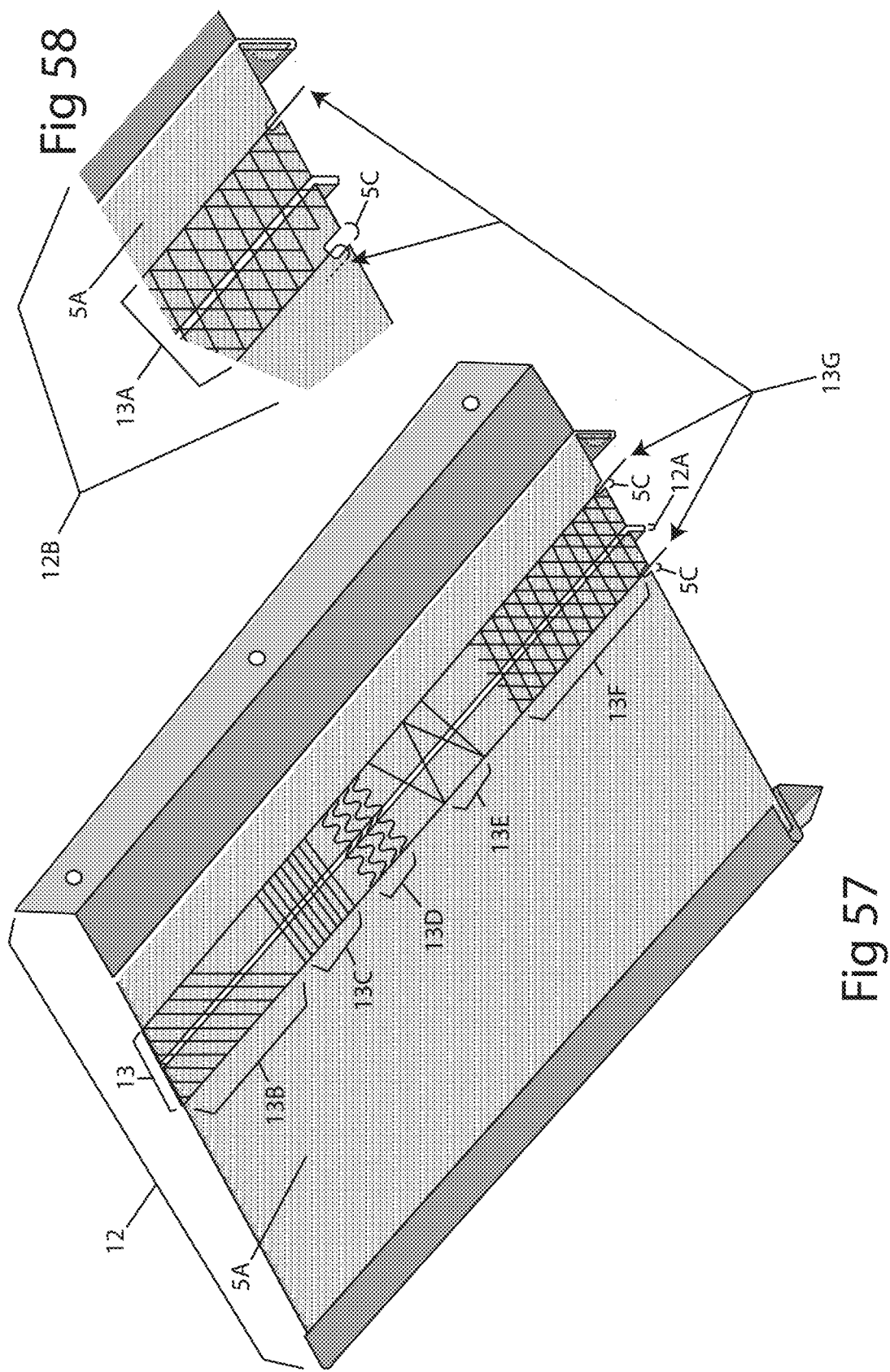

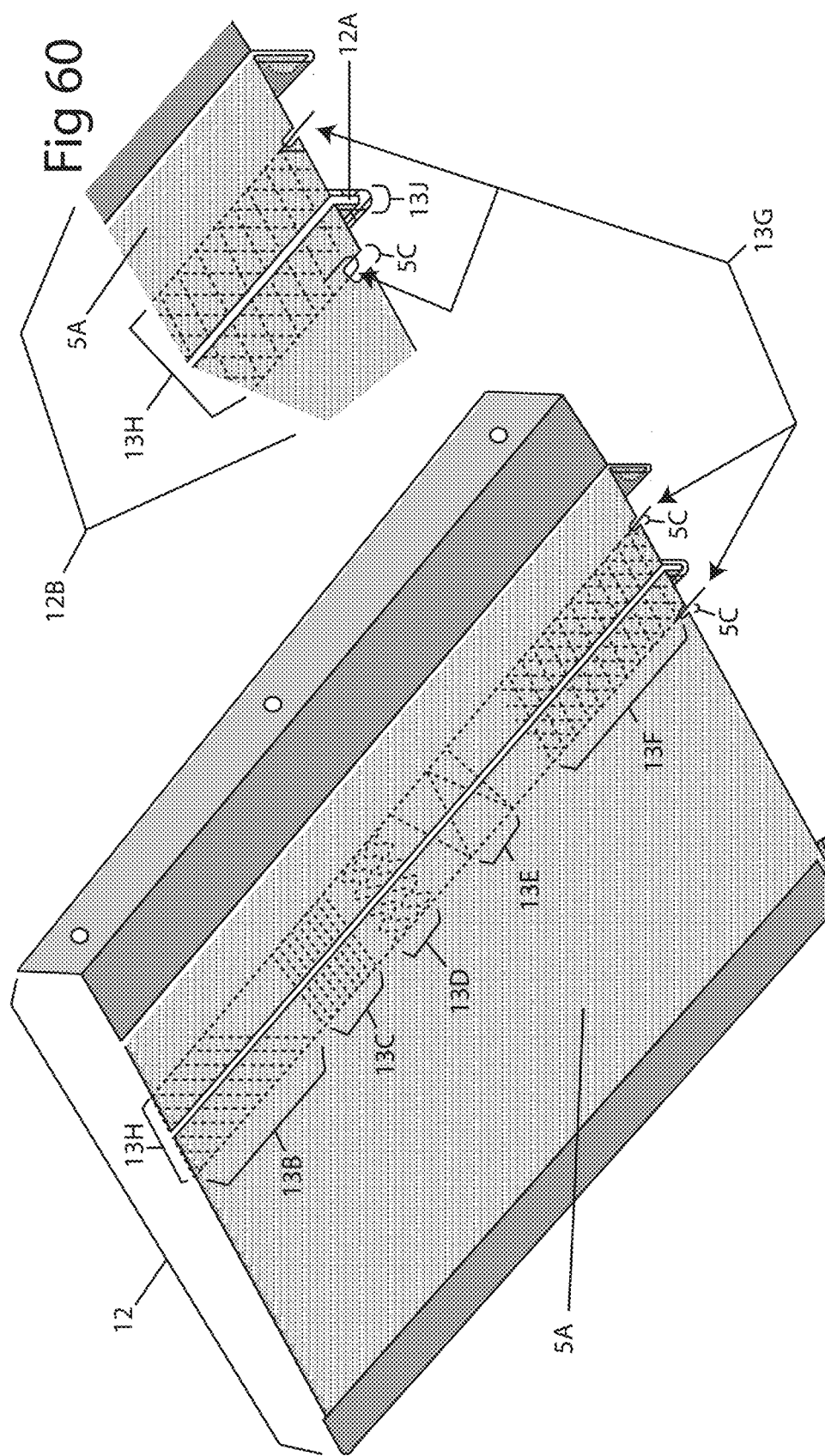

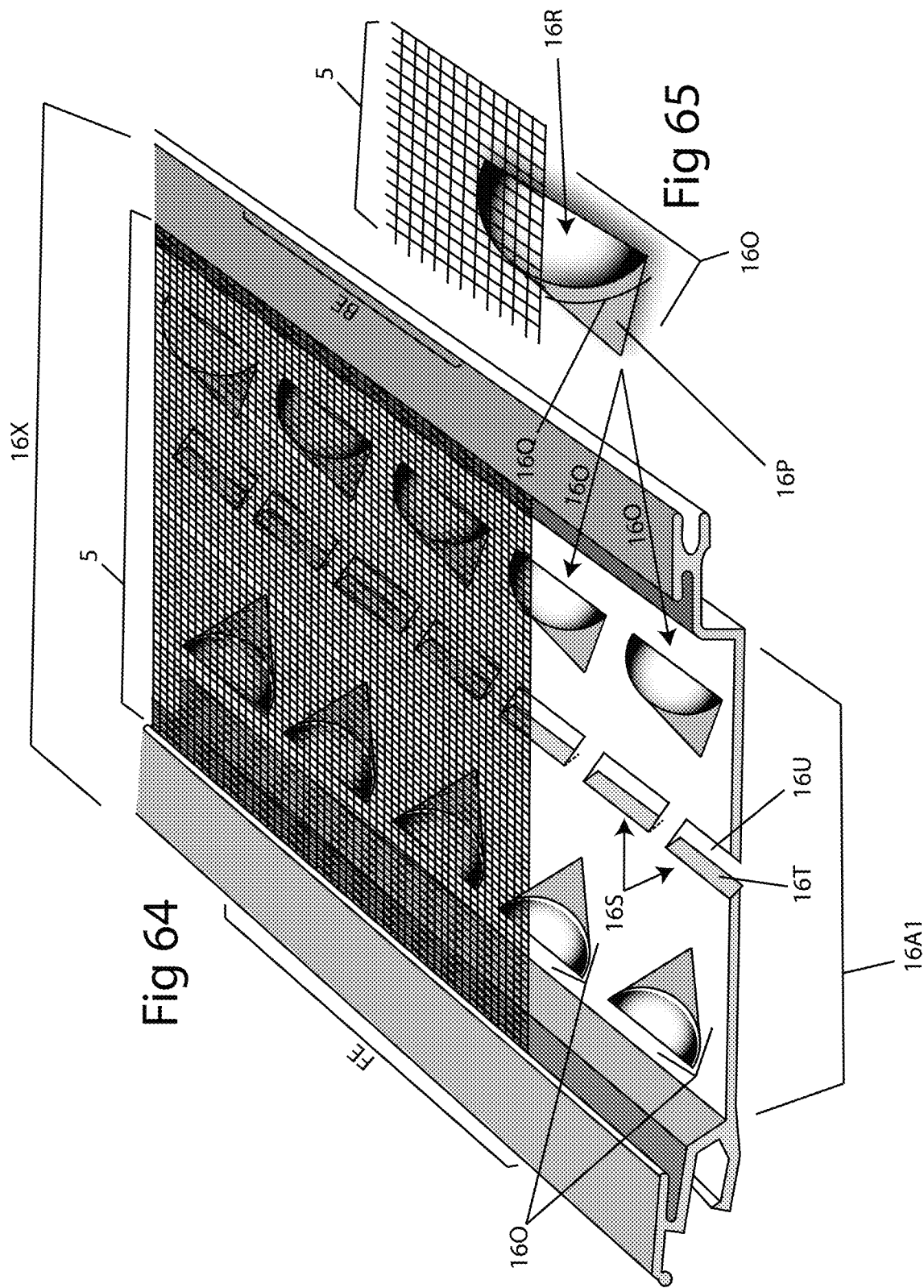

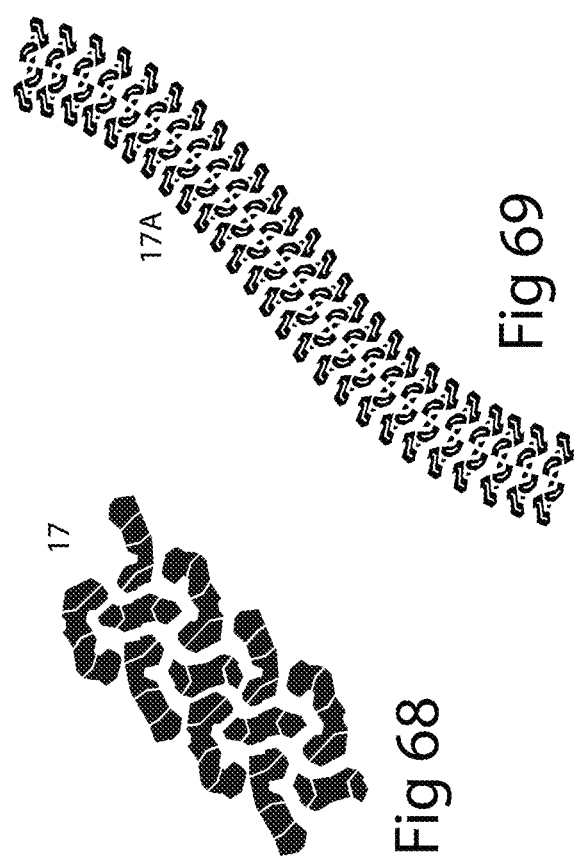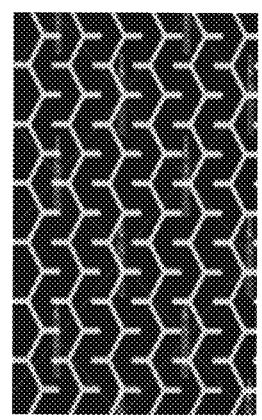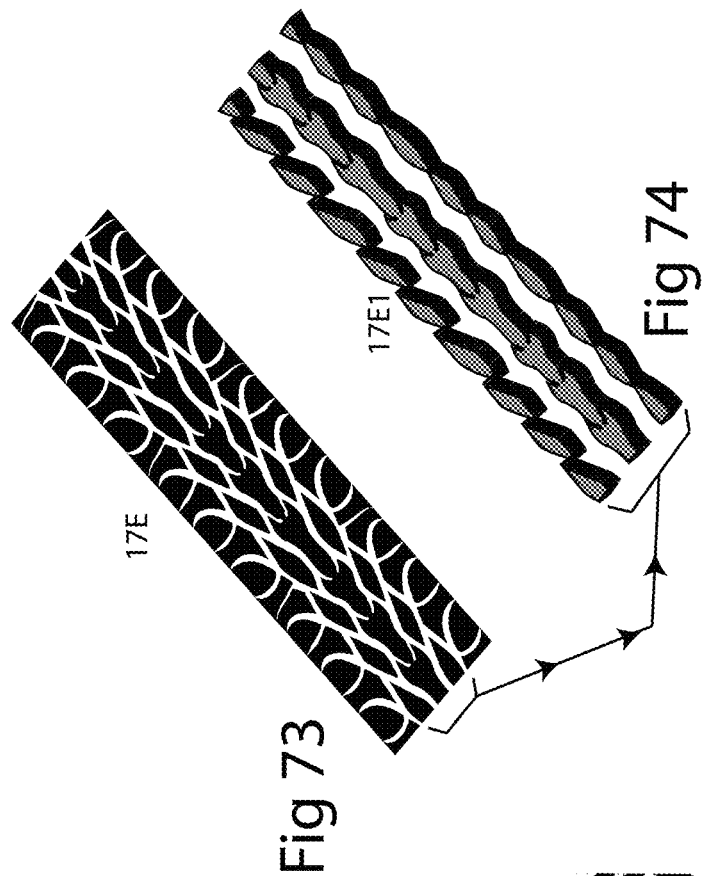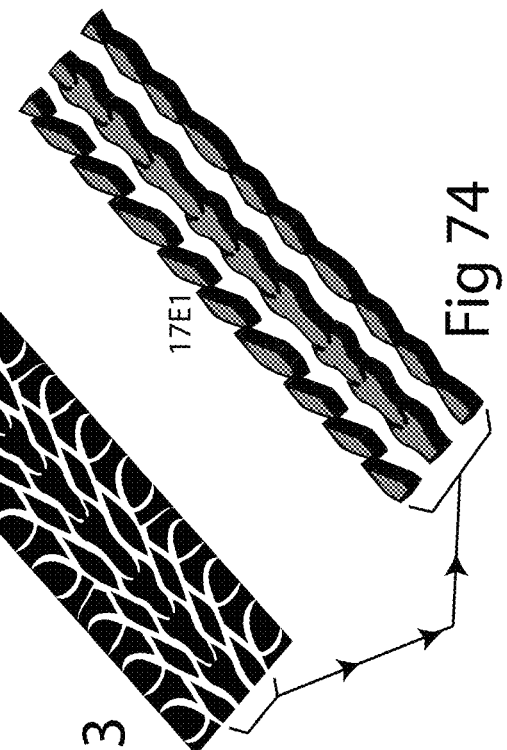
Fig 68 Fig 69 Fig 70 Fig 71 Fig 72 Fig 73 Fig 74

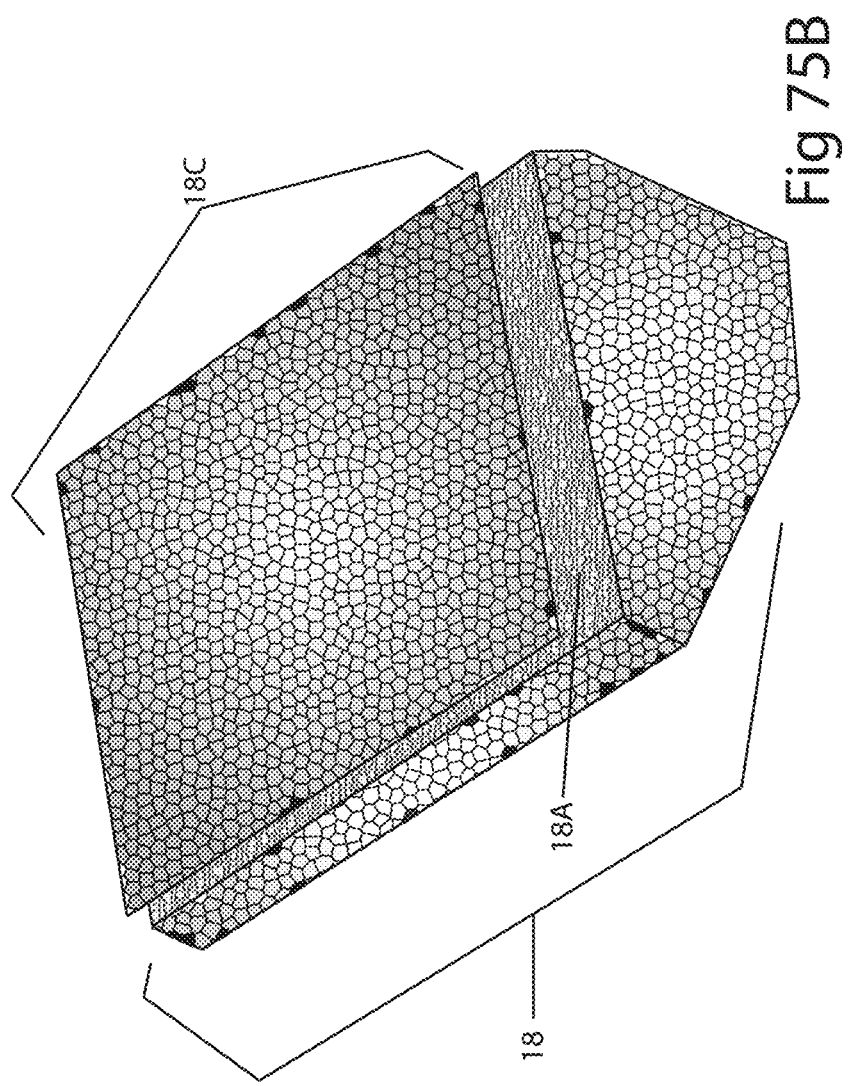

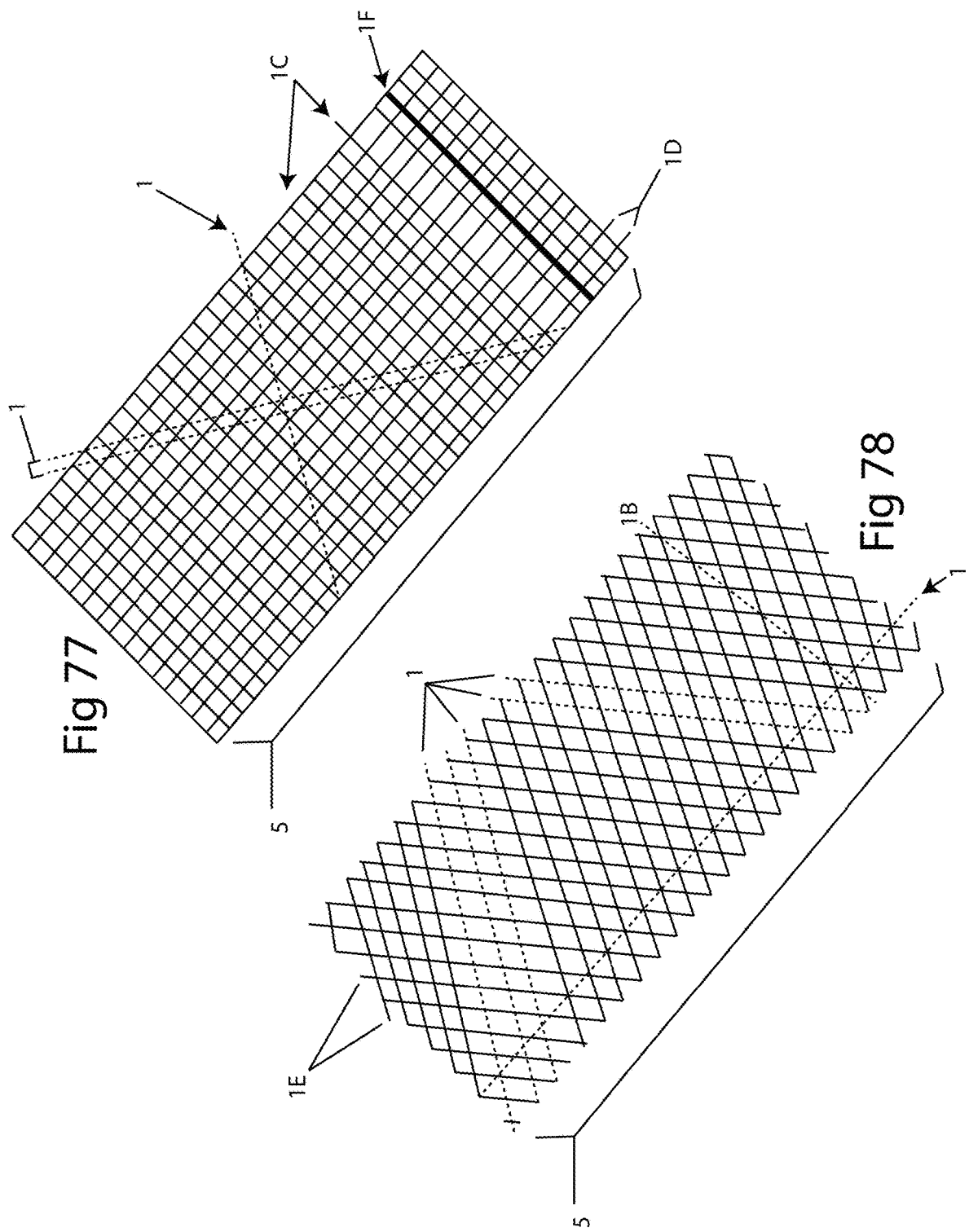

FILTERING MESH WITH GROWTH INHIBITING MATERIAL

This application claims the benefit of U.S. Provisional Patent Application No. 62/673,735 filed May 18, 2018, and U.S. patent application Ser. No. 13/336,448, filed Dec. 23, 2011.

FIELD

The present invention relates generally to meshes and other water-permeable surfaces. More specifically, particular embodiments of the invention relate to a mesh that has anti-growth properties and other properties.

BACKGROUND

Many homes and other buildings have gutters that collect rain water and divert the collected rain water downward to the ground or other surfaces. Leaves and other debris can accumulate in the gutters either from being directly deposited into the gutters or from being washed off of or otherwise moved from the roof to the gutter.

A problem exists in that the above-mentioned debris can accumulate to the point of blocking the gutter and causing the water to overflow an edge of the gutter instead of flow through the gutter as designed. Various devices have been created in an attempt to prevent the clogging of gutters. Most, if not all, of these devices do not prevent clogging in a satisfactory manner.

Accordingly, improved systems and methods for preventing the clogging of gutters are needed.

SUMMARY

In one aspect, a filtration device for filtering a fluid that passes over the filtration device includes a screen through which the fluid can pass, the screen having a top side, a bottom side, and a plurality of members, at least a portion of the plurality of members being a first material; and a growth inhibiting element that is one of attached to and a part of the screen, the growth inhibiting element being a second material, wherein the second material and the first material are different materials.

In another aspect, a gutter guard configured to attach to a rain gutter on a building to separate debris from rain water flowing off a roof of the building includes a screen through which the rain water can pass in a filtered flow direction that is through the screen, the screen having a top side, a bottom side, and a plurality of members; and a protrusion extending from the screen.

In another aspect, a method of filtering a fluid includes passing the fluid through apertures in a screen, wherein the screen has members made of a first material and a member made of a second material, the second material is a growth inhibiting material, and the second material and the first material are different materials.

Further areas of applicability of the present invention will become apparent from the detailed description provided hereinafter. It should be understood that the detailed description and specific examples, while indicating preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a perspective view of a wire;

FIG. 2 is a perspective view of a wire illustrating water flow paths;

FIG. 3 is a perspective view of a wire illustrating an example of build-up present on a wire;

FIG. 4 is a perspective view of a wire illustrating water flow paths being changed by build-up on a wire;

FIG. 5 is a perspective view of two wires illustrating an open air space between the wires;

FIG. 6 is a perspective view of two wires coated with build-up;

FIG. 8 is a perspective view of a screen;

FIG. 9 is a perspective view of a screen in accordance with exemplary embodiments of the invention;

FIG. 10 is a perspective view of a screen in accordance with exemplary embodiments of the invention;

FIG. 11 is a perspective view of a screen having a pattern, in accordance with exemplary embodiments of the invention;

FIG. 12 is a perspective view of a downwardly extending channel having a pattern, in accordance with exemplary embodiments of the invention;

FIG. 13 is a perspective view of an upwardly extending channel having a pattern, in accordance with exemplary embodiments of the invention;

FIG. 14 is a perspective view of a gutter guard having a corrugated screen and a wire on the underside of the screen in accordance with exemplary embodiments of the invention;

FIG. 14A is a cross-sectional view of a corrugation present in the screen of FIG. 14;

FIG. 15 is a cross-sectional view of a corrugation pattern of a screen in accordance with exemplary embodiments of the invention;

FIG. 16 is a cross-sectional view of a corrugation pattern of a screen in accordance with exemplary embodiments of the invention;

FIG. 17 is a cross-sectional view of a corrugation pattern of a screen in accordance with exemplary embodiments of the invention;

FIG. 18 is a cross-sectional view of a corrugation pattern of a screen in accordance with exemplary embodiments of the invention;

FIG. 19 is a cross-sectional view of a corrugation pattern of a screen in accordance with exemplary embodiments of the invention;

FIG. 20 is a cross-sectional view of a corrugation pattern of a screen in accordance with exemplary embodiments of the invention;

FIG. 21 is a cross-sectional view of a corrugation pattern of a screen in accordance with exemplary embodiments of the invention;

FIG. 22 is a cross-sectional view of a corrugation pattern of a screen in accordance with exemplary embodiments of the invention;

FIG. 23 is a cross-sectional view of a corrugation pattern of a screen in accordance with exemplary embodiments of the invention;

FIG. 24 is a cross-sectional view of a corrugation pattern of a screen in accordance with exemplary embodiments of the invention;

FIG. 25 is a cross-sectional view of a corrugation pattern of a screen in accordance with exemplary embodiments of the invention;

FIG. 26 is a cross-sectional view of a corrugation pattern of a screen in accordance with exemplary embodiments of the invention;

FIG. 27 is a cross-sectional view of a corrugation pattern of a screen in accordance with exemplary embodiments of the invention;

FIG. 28 is a cross-sectional view of a corrugation pattern of a screen in accordance with exemplary embodiments of the invention;

FIG. 29 is a cross-sectional view of a corrugation pattern of a screen in accordance with exemplary embodiments of the invention;

FIG. 30 is a cross-sectional view of a corrugation pattern of a screen in accordance with exemplary embodiments of the invention;

FIG. 31 is a cross-sectional view of a corrugation pattern of a screen in accordance with exemplary embodiments of the invention;

FIG. 32 is a cross-sectional view of a corrugation pattern of a screen in accordance with exemplary embodiments of the invention;

FIG. 33 is a cross-sectional view of a corrugation pattern of a screen in accordance with exemplary embodiments of the invention;

FIG. 34 is a perspective view of the corrugated profile shown in FIG. 24 showing the corrugation in a longitudinal direction;

FIG. 35 is a perspective view of the corrugated profile shown in FIG. 24 showing the corrugation in a transverse direction;

FIG. 36 is a perspective view of the corrugated profile shown in FIG. 33 showing the corrugation in a longitudinal direction;

FIG. 37 is a perspective view of the corrugated profile shown in FIG. 33 showing the corrugation in a transverse direction;

FIG. 38 is a plan view of a screen in accordance with exemplary embodiments of the invention, having a non-linear shape;

FIG. 39 is a side view of the screen of FIG. 38;

FIG. 40 is a side view of the screen of FIG. 38;

FIG. 41 is a side view of the screen of FIG. 38;

FIG. 42 is a plan view of a screen in accordance with embodiments of the invention;

FIG. 43 shows an example of a pattern incorporated into a screen in accordance with exemplary embodiments of the invention;

FIG. 44 shows an example of a pattern incorporated into a screen in accordance with exemplary embodiments of the invention;

FIG. 45 shows an example of a pattern incorporated into a screen in accordance with exemplary embodiments of the invention;

FIG. 46 shows an example of a pattern incorporated into a screen in accordance with exemplary embodiments of the invention;

FIG. 47 shows an example of a pattern incorporated into a screen in accordance with exemplary embodiments of the invention;

FIG. 48 shows an example of a pattern incorporated into a screen in accordance with exemplary embodiments of the invention;

FIG. 49 shows an example of a pattern incorporated into a screen in accordance with exemplary embodiments of the invention;

FIG. 50 is a perspective view of exemplary embodiments of the invention;

FIG. 51 is a perspective view of an insert in accordance with exemplary embodiments of the invention;

FIG. 52 is a perspective view of exemplary embodiments of the invention;

FIG. 53 is a perspective view of an insert in accordance with exemplary embodiments of the invention;

FIG. 54 is a perspective view of exemplary embodiments of the invention;

FIG. 55 is a perspective view of an insert in accordance with exemplary embodiments of the invention;

FIG. 56 is a perspective view of an insert in accordance with exemplary embodiments of the invention;

FIG. 56A is a perspective view of an insert in accordance with exemplary embodiments of the invention;

FIG. 57 is a perspective view of exemplary embodiments of the invention;

FIG. 58 is a detail view of an edge the embodiment shown in FIG. 57;

FIG. 59 is a perspective view of exemplary embodiments of the invention;

FIG. 60 is a detail view of an edge the embodiment shown in FIG. 59;

FIG. 64 is a perspective view of exemplary embodiments of the invention;

FIG. 65 is a detail view of the embodiment shown in FIG. 64;

FIG. 68 shows an exemplary embodiment of a pattern in accordance with embodiments of the invention;

FIG. 69 shows an exemplary embodiment of a pattern in accordance with embodiments of the invention;

FIG. 70 shows an exemplary embodiment of a pattern in accordance with embodiments of the invention;

FIG. 71 shows an exemplary embodiment of a pattern in accordance with embodiments of the invention;

FIG. 72 shows an exemplary embodiment of a pattern in accordance with embodiments of the invention;

FIG. 73 shows an exemplary embodiment of a pattern in accordance with embodiments of the invention;

FIG. 74 shows an exemplary embodiment of a pattern in accordance with embodiments of the invention;

FIG. 75B is a perspective view of exemplary embodiments of the invention;

FIG. 77 is a perspective view of a screen in accordance with exemplary embodiments of the invention;

FIG. 78 is a perspective view of a screen in accordance with exemplary embodiments of the invention;

Figure 7:
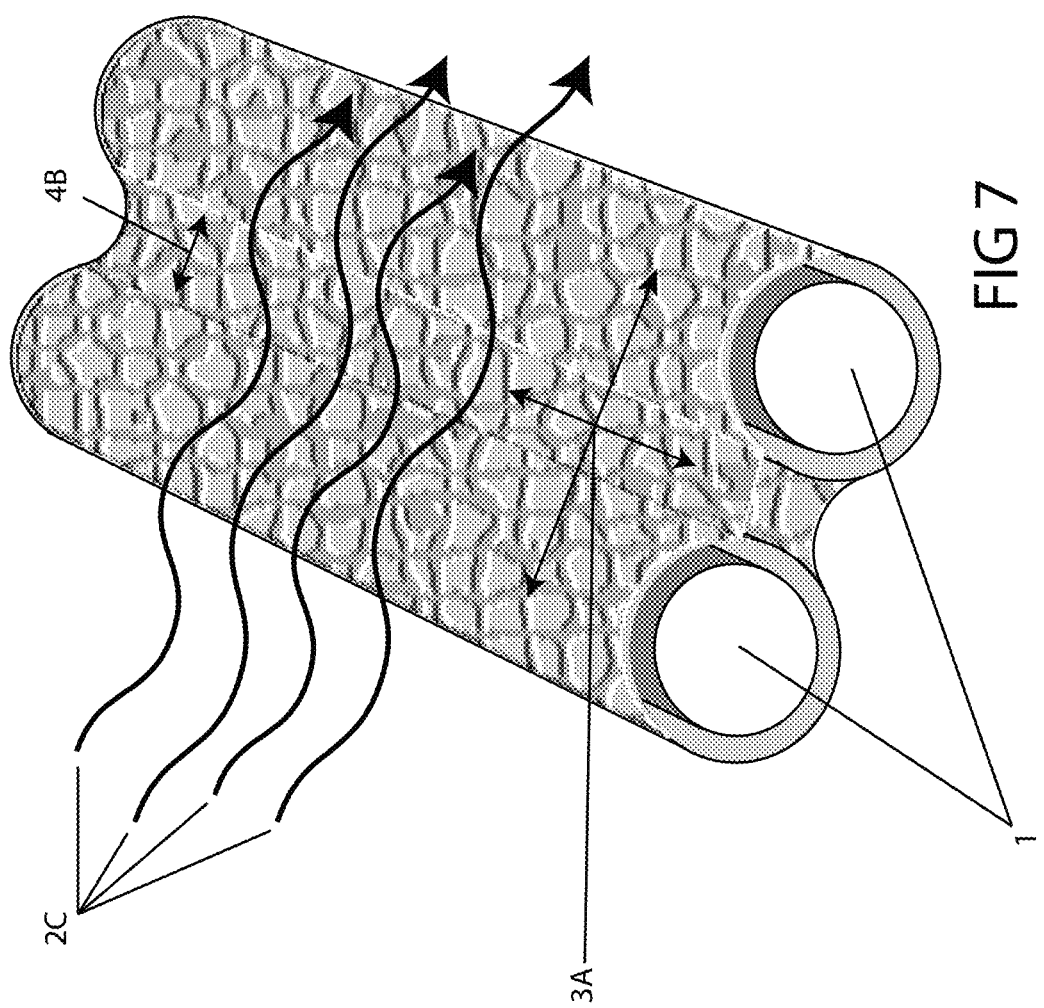
FIG. 7 is a perspective view of two wires coated with build-up.

All drawings are schematic and not necessarily to scale. Parts given a reference numerical designation in one figure may be considered to be the same parts where they appear in other figures without a numerical designation for brevity unless specifically labeled with a different part number and described herein.

DETAILED DESCRIPTION

The following description of the preferred embodiment(s) is merely exemplary in nature and is in no way intended to limit the invention, its application, or uses.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "connected," "coupled," "interconnected," and similar refer to a relationship wherein structures are secured or attached to one another either directly or indirectly through intervening structures, as well as both movable or rigid attachments or relationships, unless expressly described otherwise. The term "fixed" refers to two structures that cannot be separated without damaging one of the structures. The term "filled" refers to a state that includes completely filled or partially filled in a solid or non-solid state.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

While the example of a gutter guard to prevent clogging of a rain gutter is used to describe embodiments of the invention, it is noted that the invention also applies to other filtering applications such as, for example, filtering drinkable liquids, and filtering any liquid that is improved by killing moss, mold, mildew, algae, lichen, microbes, bacteria, viruses, germs, the detoxification of toxic elements, and/or the reduction of harmful radiation.

As stated above, a problem exists in that debris can accumulate to the point of blocking the gutter and causing the water to overflow an edge of the gutter instead of flow through the gutter as designed. This debris can include, for non-limiting example, leaves, parts of leaves, seeds, seed pods, other tree material, moss, spores and other products from organisms growing on roofs, material from decaying roof shingles, etc. A mesh screen can be used to block debris from entering the gutter. Embodiments of the invention, examples of which are described in more detail below, provide one or more wires or threads of a metal or other material that is a different material from the material of the screen. In embodiments, this wire or thread acts as a growth inhibiting material to prevent growth on the screen. As described below, the growth inhibiting material can, itself, over time cause a partial blockage of the screen. Embodiments of the invention provide a solution to a problem caused by this growth.

This description describes several exemplary embodiments of the invention. Many of these embodiments include copper wire, or copper element(s) having a variety of shapes. One or more of certain properties of copper, namely, for example, the ability to prevent or kill moss, mold, mildew, algae, lichen, microbes, bacteria, viruses, germs, and/or the ability to detoxify toxic elements and/or render harmless harmful radiations, are advantageously used in embodiments of the invention. An example of such a material is bacteria killing ceramics. For simplicity and clarity, it is understood that when the term "copper" is used in this disclosure, other metals and other materials having properties or made to have properties able to prevent or kill moss, mold, mildew, algae, lichen, microbes, bacteria, viruses, germs, and/or the ability to detoxify toxic elements and/or render harmless harmful radiations can also be used. In addition to the term "copper", the terms "growth inhibiting wire", "growth inhibiting thread", "growth inhibiting element", or "growth inhibiting material" is used in this disclosure to represent copper and/or any other material that inhibits growth and/or has one or more of the exemplary properties listed above.

In this disclosure, the term "wire" is understood to also include thread or other elongated structures; the term "oxidation" is understood to include redox reaction, efflorescence and cupric chloride; the term "ribbon" is understood to mean any material with more length than width and capable of flexing; the term "screen" is understood to also include any structure, barrier, cloth, material or method able to prevent the passing of at least one element while allowing one or more other elements to pass through the body of the screen; also included in the invention is any structure, material or method able to change the property of any liquid, gas, moss, mold, mildew, algae, lichen, microbes, bacteria, poison, toxin, radiation, virus or germ that passes through it; and the term "shape" is understood to also include graphical representations of words, letters, phrases, logos, lines, numbers, etc. The term "mechanical waterproofing" is understood to mean a property of water flow that occurs when water contacts a solid or somewhat solid surface where the angle of such surface is in close proximity to the angle of any screen the solid or somewhat solid surface immediately precedes. When this takes place, the water that would normally drop down through a screen (under the force of gravity) will, instead, continue to flow across the screen until it reaches the screen's terminal edge unless the forward flow is interrupted by a feature designed to direct water downward through the screen's open air spaces.

FIG. 1 shows a wire 1 that can be a copper wire. FIG. 2 shows wire 1 being contacted by water 2 that flows forward along the surface of wire 1. FIG. 3 shows wire 1 having oxidation particles 3 forming on wire 1 which may cause water 2 to cease flowing forward in a mostly or completely uniform manner and begin flowing, as shown in FIG. 4, in random directions, represented by 2A. Such oxidation 3 occurs in some situations in environments or when copper contacts or is in close proximity to metals or materials that have an anodic numerical difference greater than 0.15 volts than that of copper.

FIG. 8 shows a screen 5 that includes copper threads 1 and stainless steel or other material threads 1A. Forward flowing water following mostly uniform flow paths 2 are shown becoming random flow paths 2A as they contact and become impeded by oxidation particles and powder 3 which often form with a granular or rough texture which diverts the water into random flow paths 2A. Threads 1A initially slow the forward flow of water and redirects the water down (as shown by arrows 2B) through open air spaces 4 existing between threads 1, 1A of screen 5. However, this redirection of the water, in some cases, is not sustained along the entire screen 5. Water 2D that passes by the oxidation particles and powder 3 and does not penetrate screen 5 continues along the top of screen 5. In embodiments, the screen is a perforated metal, or other material, sheet such as, for example, a punched metal or expanded metal.

FIGS. 5-7 show two copper wires 1 adjacent to one another and show a progressive formation of oxidation 3A occurring. FIG. 5 shows no oxidation 3A and an air space 4 between the two wires 1. FIG. 6 shows oxidation 3A increasing as it begins to completely coat wires 1 and narrows air space 4 to a smaller air space 4A. FIG. 7 shows that oxidation 3A can eventually fill the formerly open air space 4, 4A between wires 1 forming an oxidation "mat" 3A with the result that water flow 2C is no longer directed downward through open air spaces or impeded by individual oxidation particles. Instead, water flow 2C transitions forward across the oxidation mat 3A that has coated the top surface of the screen 5 wires 1 and filled in the open air space between them (indicated by 4B).

Figure 8A:
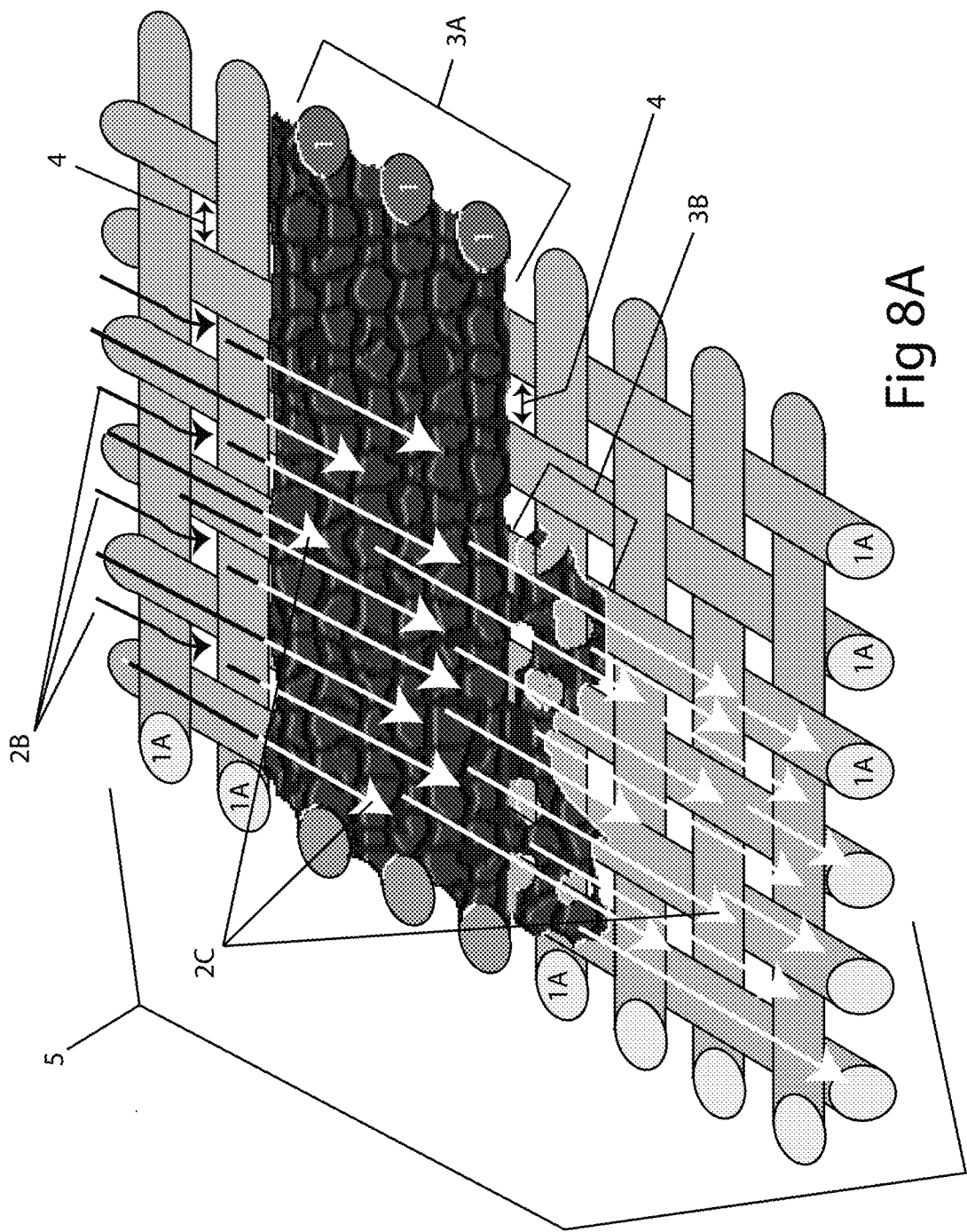
FIG. 8A is a perspective view of the screen of FIG. 8 having portions blocked by build-up.

FIG. 8A shows a screen 5 having an area of the screen covered by oxidation particles that have congregated into oxidation mat 3A and partial oxidation mat 3B. This demonstrates how oxidation, once it builds and/or congeals, causes an effect that is referred to as mechanical waterproofing. Water 2B that would normally flow downward through open air spaces 4 will begin to bypass open air spaces 4 and continue flowing forward once the water 2C has contacted any solid or partially solid surface (such as oxidation mat 3A and partial oxidation mat 3B) which now covers both wires 1, 1A and open air spaces 4 between wires 1, 1A. The inventor discovered that if such solid or mostly solid surfaces (such as 3A, 3B) are in the same or nearly the same plane as a successive (downstream) area of uncoated or un-matted screen, the water 2C will bypass all or mostly all of the open air spaces it encounters until reaching the terminal edge of the screen. This effect renders gutter guards employing screens as their water receiving areas impermeable to water penetration. Although water 2C may have acquired copper properties by passing over the copper infused oxidation mats 3A, 3B, screen 5 is no longer able to direct water downward through open air spaces 4 present within screen 5 into an underlying rain gutter. This mechanical waterproofing may occur on any screen or structures that serve as screens.

With this discovery in mind, the invention teaches that in order to employ copper wires or other copper elements that produce oxidation mats in and/or on screens employed as liquid receiving areas, the position of copper wires or elements is preferably planned and it may also be beneficial to: (i) form structural features into the screen; and/or (ii) add structural features to the screen, and/or (iii) position structural features in close proximity to the screen to avoid mechanically waterproofing large liquid-receiving areas of the screen. Elements that interact with the screen may also be employed.

FIG. 9 shows a view of a screen 5 having individual wires that make up screen 5. FIG. 10 shows a screen 5A that is structurally similar to screen 5 of FIG. 9 but visually different in that it has a solid "cloth-textured appearance" that does not show visually discernable threads although they are present. FIG. 11 shows that a screen having a cloth-textured appearance, such as screen 5A, can make certain features present in the screen 5A such as a pattern 6E more discernible. This is due to the finer thread and/or closer spacing of the thread of a screen 5A having a cloth-textured appearance. FIG. 12 shows a section 5G of a screen (such as, for example, screen 5) having a downward extending channel or corrugation 9 having a partial tire tread pattern 6E present in or on or under the bottom plane of channel 9. Tire tread patterns, by design, have an ability to divert and redirect water. In some embodiments, such a pattern is embossed or pressed into the screen in any direction covering all or a portion of the screen or it is added as a separate element such as an adhesive applique or sprayed adhesive pattern coated with copper particles or as solid or perforated metal or screen affixed or attached to screen 5G by adhesion, tension, or other methods. FIG. 13 illustrates a section 5G of screen (such as, for example, screen 5) having an upwardly raised channel or corrugation 9A. The top surface of raised channel or corrugation 9A is shown having a partial tire tread pattern 6E in or on or under the top surface of raised channel or corrugation 9A.

Figure 76:
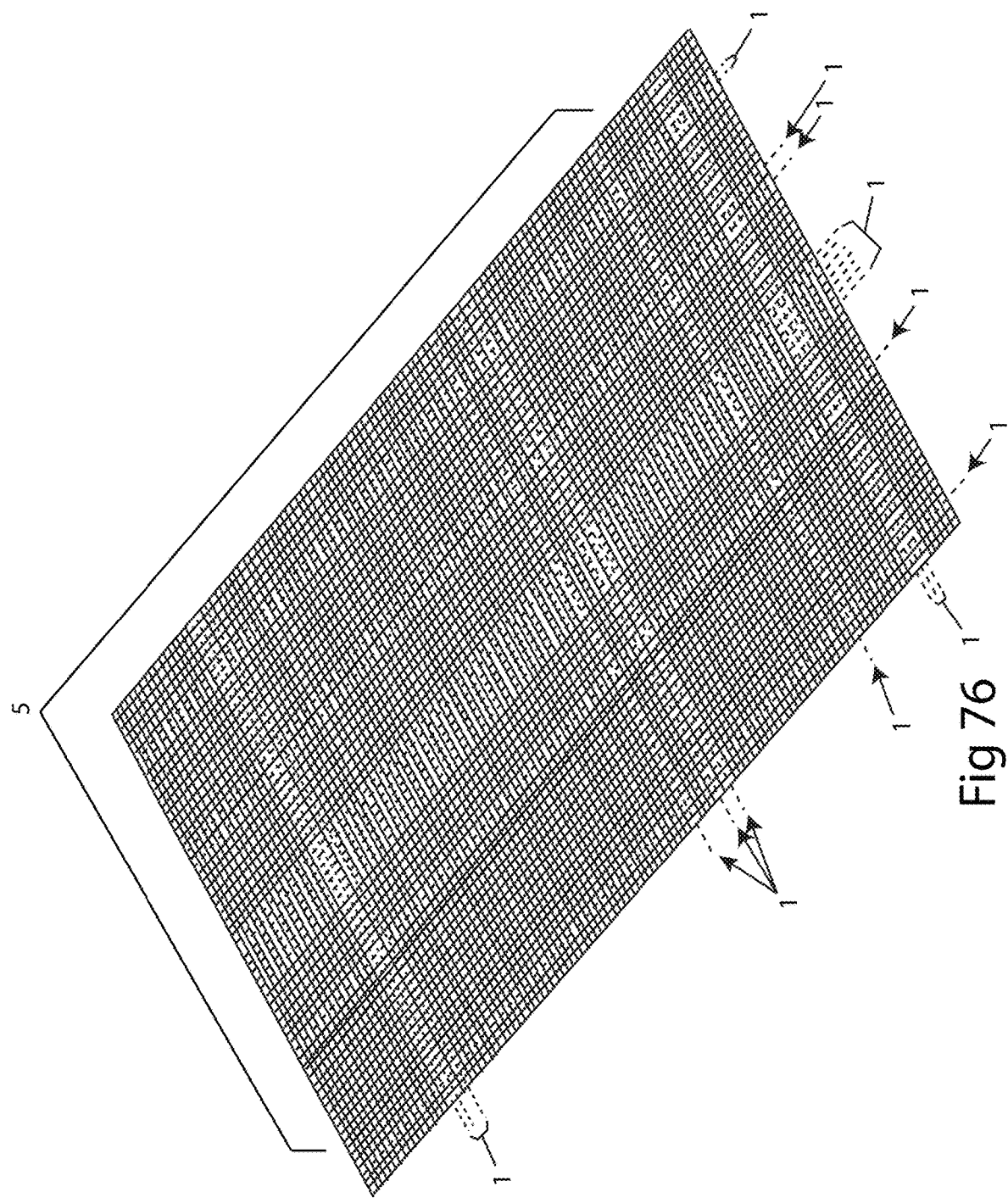
FIG. 76 is a perspective view of a screen in accordance with exemplary embodiments of the invention.

FIG. 76 is a view of a screen 5 showing copper threads 1 either woven, knitted or sewn (on or through screen 5) in a warp or weft direction at random locations into or onto the matrix of screen 5 illustrating that, in embodiments, any number of copper threads can be a part of, or attached to, a screen or any segment of a screen in a warp or weft direction. FIG. 77 illustrates that, in embodiments, copper threads 1 can additionally be woven, knitted, sewn, into, onto, or applied onto a screen 5 in a diagonal direction for a length of the screen. Also shown in FIG. 77 is a braid 1F (discussed below in relation to FIG. 80). FIG. 77 additionally shows an example of an embodiment in which screen 5 has warp (front edge to back edge) directioned threads 1C made of stainless steel infused with manganese or phosphorous or threads comprised of metal alloys that provide a stiff thread with a greater hardness than that of weft (longitudinal directioned) threads 1D. This makes the screen less susceptible to concaving or convexing in embodiments where the screen spans large unsupported-from-the-underside water receiving areas of a gutter guard, or in embodiments where the screen serves unilaterally as a gutter guard or as the main portion of a gutter guard. Concurrently, the softer weft threads 1D allow the screen to be rolled into large screen rolls without crimping weft threads 1D, with the screen roll then being able to be unrolled by means of a decoiler, for example, during the manufacturing process. Other advantages of a "hard warp, soft weft" thread screen may exist and be employed in this invention or as a component of other inventions. Throughout this disclosure, a "harder warp, softer weft" threaded screen may be substituted for a corrugated screen.

Although not illustrated, threads may additionally be woven, knitted, sewn into or onto or applied onto any screen or segment or side of a screen in any pattern or direction.

FIG. 78 is another embodiment showing a screen 5 having threads 1E woven in a diagonal direction. Also shown are copper threads 1 woven in a diagonal direction, a copper thread 1 traversing in a longitudinal/weft direction, and a copper thread 1B traversing in a transverse or warp direction. Other embodiments use a different number, or only some of, copper threads 1 shown in FIG. 78.

Figure 63:
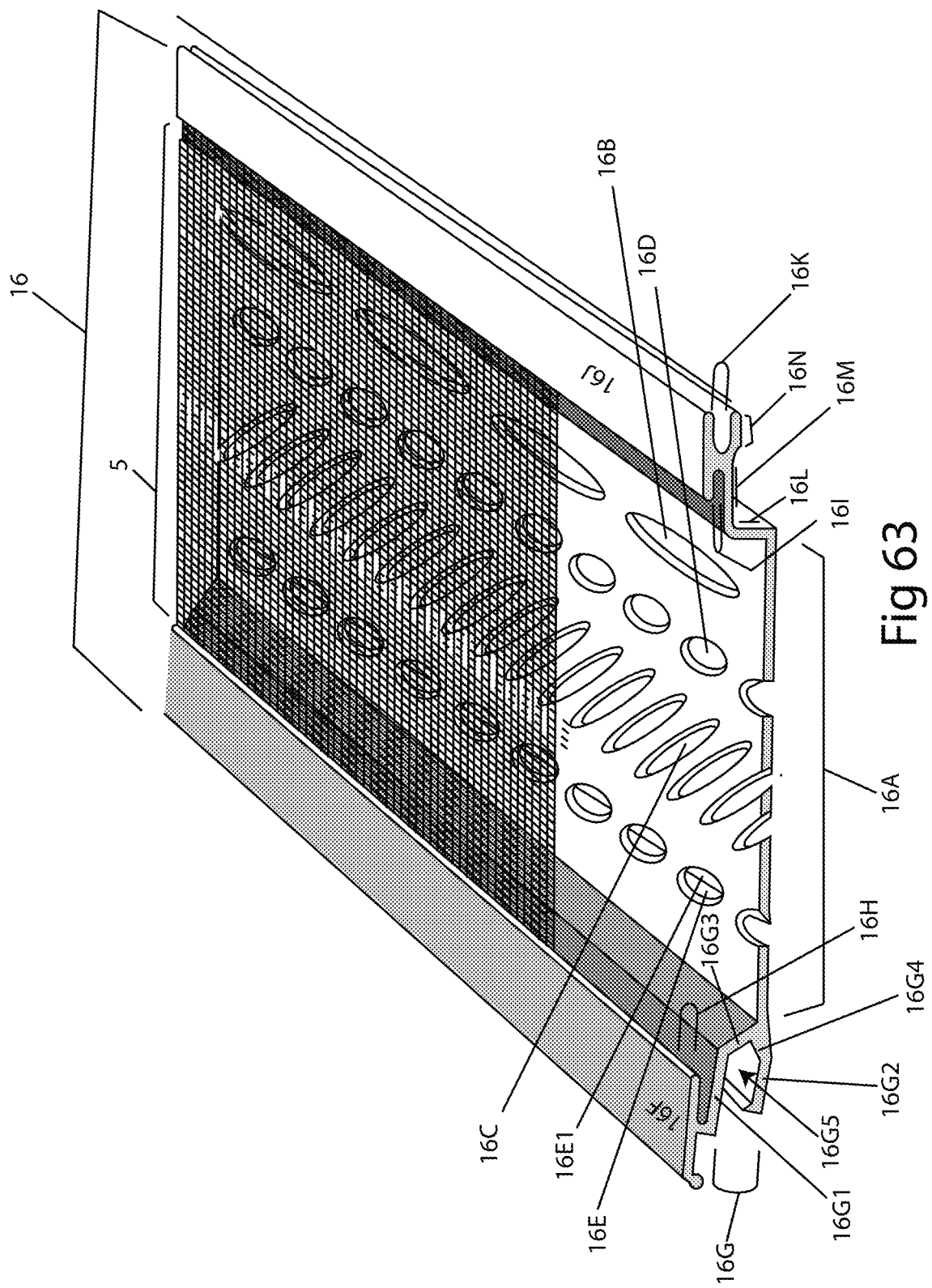
FIG. 63 is a perspective view of exemplary embodiments of the invention.

FIG. 63 shows a gutter guard 16 having a perforated lower plane 16A overlain by a screen 5 which serve in combination as a water receiving area of gutter guard 16. The term "gutter guard" is understood to mean a structure for preventing or reducing the amount of debris that enters a gutter such as, for example, a rain gutter on a building. Perforations 16B, 16C, 16D, 16E present in perforated lower plane 16A are shown to demonstrate that any type, size, or shape of perforation may be employed by gutter guard 16. A body of gutter guard 16 has a T-shaped first member 16F that overlies and adjoins a modified U-shaped lower member 16G having an upper plane 16G1, a lower plane 16G2 and two rear sidewalls 16G3, 16G4. U-shaped lower member 16G utilizes a channel 16G5 that is able to receives a downward angling plane present at the rear of the top lip of some rain gutters such as, for example, K-style gutters. U-shaped lower member 16G adjoins perforated lower plane 16A, which has an upward extending plane 16L that adjoins a lateral plane 16M. Lateral plane 16M adjoins a T-shaped member 16J which has an extending lateral lower plane 16N. Element 16K is a receiving channel existing above lateral lower plane 16N. Receiving channel 16K is configured to receive various elements to enable gutter guard 16 to be secured or adjoined or made adjacent to a fascia board of a building, or that may enable gutter guard 16 to be secured to or rest upon the sub-roof or other structure of a building.

FIG. 64 shows a gutter guard 16X having a louvered lower plane 16A1 overlain by a screen 5 which serve in combination as a water receiving area of gutter guard 16X. FIG. 65 shows a larger scale representation of hooded louvers/perforations/extensions 160 present in louvered lower plane 16A1 of this embodiment. Louvers 160 are shown having a raised hood 16P framing an open air space 16R. Raised hood 16P has an edge 16Q that is shown, in this embodiment, touching or in close proximity to screen 5. In some embodiments screen 5 has copper threads present within its matrix. In other embodiments screen 5 does not have copper threads present within its matrix. FIG. 64 shows louvers 160 facing toward a rear edge BE of gutter guard 16X as well as facing toward a front edge FE of gutter guard 16X. Also shown are elongated openings 16S having planes 16T that extend downward leaving open air spaces 16U for water to flow through. In this embodiment, downward extending planes 16T of openings 16S extend from the long edge of elongated openings 16S closest to front edge FE of gutter guard 16X. In this embodiment, the body profile of gutter guard 16X is the same as the body profile of gutter guard 16 shown in FIG. 63. It is understood that the shapes, dimensions, placement and/or direction of louvers, perforations and extensions are not limited to the embodiments shown. The embodiments shown in the figures are only representative.

FIGS. 14 and 14A illustrate a gutter guard 10 having a screen 5 being shaped to be placed on and/or in a rain gutter. Screen 5 has a first portion 1OA that rests on or under the front lip of a rain gutter, a second portion 1OG which is a downwardly extending inseam adjacent to a third portion 1OH which is the main body of gutter guard 10. Main body 10H of gutter guard 10 has a rear portion 1OB that folds under main body 10H and then extends downwardly into a rear leg 1OC. Rear leg 1OC is angled away (indicated by 1OE) from main body 10H and has an upward fold 1OD at its terminal edge. Gutter guard 10 is shown having one single copper thread 1 present within its matrix in a left edge to right edge direction and one single copper thread 1 present within its matrix in a front to rear direction. FIG. 14 also shows gutter guard 10 having a bead of caulk or adhesive or other element 1OF adjacent to an underside of main body 1OH which serves to intercept water flowing on and through screen 5 and redirect it downward into an underlying rain gutter. A bead of caulk or adhesive or other element can extend through screen 5 in some embodiments. In embodiments, a bead (or other shaped) application of calk or other material that hardens over a period of time is applied to add strength to screen 5. In embodiments, a bead (or other shaped) application of calk or other material that hardens over a period of time is applied to add strength to screen 5 that has few or no features that add structural stability. In embodiments, caulk or adhesive or element 1OF is made of or contains copper and may be present on any portion of the screen's top or bottom surfaces and may extend in any direction. Caulk or adhesive or other element 1OF may be sprinkled or otherwise coated or infused with copper elements. In embodiments, a protrusion can extend from screen 5, or can extend toward screen 5 from an element that is not part of screen 5. In embodiments, a protrusion can extend toward screen 5 from another screen.

Screen 5 of gutter guard 10 may or may not be corrugated or partially corrugated with corrugations of any pattern or construction traversing in any direction. FIG. 14 shows screen 5 having front edge FE to rear edge BE corrugations 6, with each corrugation 6 having a top surface 6R and downward extending sidewalls 6S. This corrugated pattern 6A is one of the various corrugated patterns whose profiles 6A-6S are illustrated, respectively, in FIGS. 15-33. This collection of corrugation profiles is intended to serve as a representative sampling only, and demonstrates that any type of corrugated pattern can be employed in the body of a screen. Further, in embodiments, corrugations extend in any direction, in linear or non-linear fashion, and completely across screen 5 or only partially across screen 5.

Although appearing as solid planes to better illustrate copper threads 1, the planes shown in FIGS. 34, 35, 36 and 37 are representative of screen. FIGS. 34 and 36 show, respectively, corrugated patterns 6J and 6S as they would appear if embodied in a screen 5 and placed in a manner that the uppermost portion of the corrugations 6J1 and 6S1 were in line with water flow coming off the roof of a building or, alternately, perpendicular to water flow coming off a roof of a building as shown in FIGS. 35, 37. Each corrugated pattern is shown having copper threads 1 present in their respective screens 5. These patterns may exist as embossments pressed upwardly or downwardly into the body of screen 5 or as independent elements adjacent to or attached to or affixed to screen 5 by adhesion, weaving, sintering or by other methods and may be present in areas that may or may not be made of or contain copper. These corrugated patterns themselves can be made of or contain copper or not made of or contain copper. Copper threads 1 present in the patterns are shown traversing in warp and weft directions but can additionally or alternatively travel in any direction. Further, in embodiments, corrugations, patterns, and threads extend in any direction, in linear or non-linear fashion, and completely across screen 5 or only partially across screen 5

FIG. 38 shows a screen 5E having upwardly or downwardly extending wave-shaped corrugations 21 pressed into the body of screen 5E that extend from the rear edge BE of screen 5E to the front edge FE of screen 5E. Although not illustrated, corrugations 21 can be of any length and travel in any direction or directions. FIG. 39 shows a single wave-shaped corrugation 21. FIG. 40 shows a wave shaped corrugation 21A having concave or convex shapes 21C present within or attached to corrugation 21A. FIG. 41 shows a wave shaped corrugation 21B having concave or convex shapes 21C with additional concave or convex shapes 21D present within or attached to the larger concave or convex shape 21C. FIG. 42 shows screen 5E having upwardly or downwardly wave-shaped corrugations 21BS and 21BT that have intrinsic or attached concave or convex shapes 21E. Corrugations 21BS, 21BT can alternatively or additionally have concave or convex shapes 21C or 21D. Corrugations 21BS, 21BT are shown traversing from the left (LE) to right (RE) edges of the screen. Although not illustrated, corrugations 21, 21A, 21B, 21BS, 21BT can also be partial and/or in a diagonal or other or multiple directions. These shapes and corrugations can be made of any material and can be present of not present in areas of the screen that contain copper.

FIGS. 43-49 are a collection of representative shape samples illustrating that any shape can be embossed upwardly or downwardly into, woven or embroidered into or onto, or adjacent to, or attached to, or affixed to, painted onto, or otherwise implemented into or onto a filtering screen or other areas of a gutter guard. FIG. 48 shows a raised emblem having a circular shape and the phrase "Team Mascot". It is noted that FIG. 48 represents any team, or association, logo, name, or symbol. As with all other shapes, these shapes can be multi-leveled to create surfaces that disrupt or reorganize the flow of water over them to create a water flow that is more likely to flow through the screen. Such shapes can be employed as a single element or as a plurality of elements present randomly or present in a pattern or patterns traversing in any direction. These shapes can be made of or contain copper or not be made of or contain copper. The shapes can be separate elements that are made of or contain copper or not be made of or contain copper. Any shape may be multi-planed/multi-dimensioned.

FIG. 50 shows a gutter guard 11 having a front assembly 11H with a receiving channel 11A adjoining a distending plane 11A1 and a rising plane 11A2 that form a securing member 11B able to secure gutter guard 11 to a front top lip of a rain gutter. Gutter guard 11 is also shown having a rear assembly 11I with a receiving channel 11D, whose rear wall extends upward into a horizontal plane 11E. Horizontal plane 11E extends upward at its rear edge into an upwardly extending plane 11F. Upwardly extending plane 11F is configured to be adjacent to a facia board of a building when gutter guard 11 is installed into or atop a rain gutter. Screws can be passed through perforations 11G present in upwardly extending plane 11F into a facia board of a building to fasten gutter guard 11 to the building. Receiving channels 11A and 11D receive the front and rear terminal edges of screen 5A. Present within the body of screen 5A is a recessed channel 11C that receives a copper or other material or other shaped or dimensioned element 8. Element 8 can be a solid material or screen or expanded metal, or a solid or porous material of any shape. FIG. 51 shows element 8 separate from screen 5A. The sidewalls 8C of element 8 can be coated with adhesive or have double sided adhesive tape attached to help secure one gutter guard 11 to an adjoining gutter guard 11 by being partially located in a recessed channel 11C of the adjoining gutter guard 11, keeping the screened area 5A of both gutter guards 11 in the same plane. Employing a stiff screen or other stiff material as an insertable element 8 can strengthen the ability of gutter guard 11 to support snow loads.

FIG. 52 shows a gutter guard 12 having a downwardly extending narrow channel 12A into which is inserted a copper or other material expanded metal screen 8A. FIG. 53 shows expanded metal screen 8A being "L" shaped having a top plane adjoining at its edge a downwardly extending plane 8A2. Expanded metal screen 8A may or may not be further secured into channel 12A with adhesive or staples that pass through downward extending channel 12A or by crimping or by other means and can overlap into the narrow channel 12A of an adjoining gutter guard 12. Employing a stiff screen or other stiff material as an insertable element 8A can strengthen the ability of gutter guard 12 to support snow loads.

FIGS. 54 and 55 show gutter guard 12 of FIG. 52 having shaped copper or non-copper elements 8B with, referring specifically now to FIG. 55, downward extending planes or channels 8B2 that are inserted into downward extending channel 12A of gutter guard 12. The downward extending channels 12A may or may not employ an adhesive tape or an adhesive or staples or crimping to further secure shaped elements 8B within downward extending channels 12A. FIG. 56 illustrates that shaped element 8B may have an additional shaped element 8B3 present on its top surface. Additional shaped element 8B3 can employ an open air space 8D transforming the insert into a louvered element that helps capture forward flowing water and redirect it downward through screen 5A offering more surface area for water contact and (in the case of additional shaped element 8D3, shaped element 8B, or screen 5A including copper) copper disbursement. In addition to the triangular shape 8B with scalloped front edge 8B1 shown in FIGS. 54-56, any shape may be employed as a shaped element having a downward extending member that would insert into the receiving channel of screen 5A. FIG. 56A shows a shaped copper element 8B4 employing a push pin 8E for securing 8B4 onto a screen (for example screen 5A). An end of push pin 8E can be bent upward after being pushed downward through screen 5A, fastening element 8B4 in place. In embodiments, any of the push pins can have an element that attaches to the bottom, similar to the back side of a lapel pin. That element can be attached in its entirety with adhesive and can start on the metal at the back and not be attached solely on the screen part.

Figure 62:
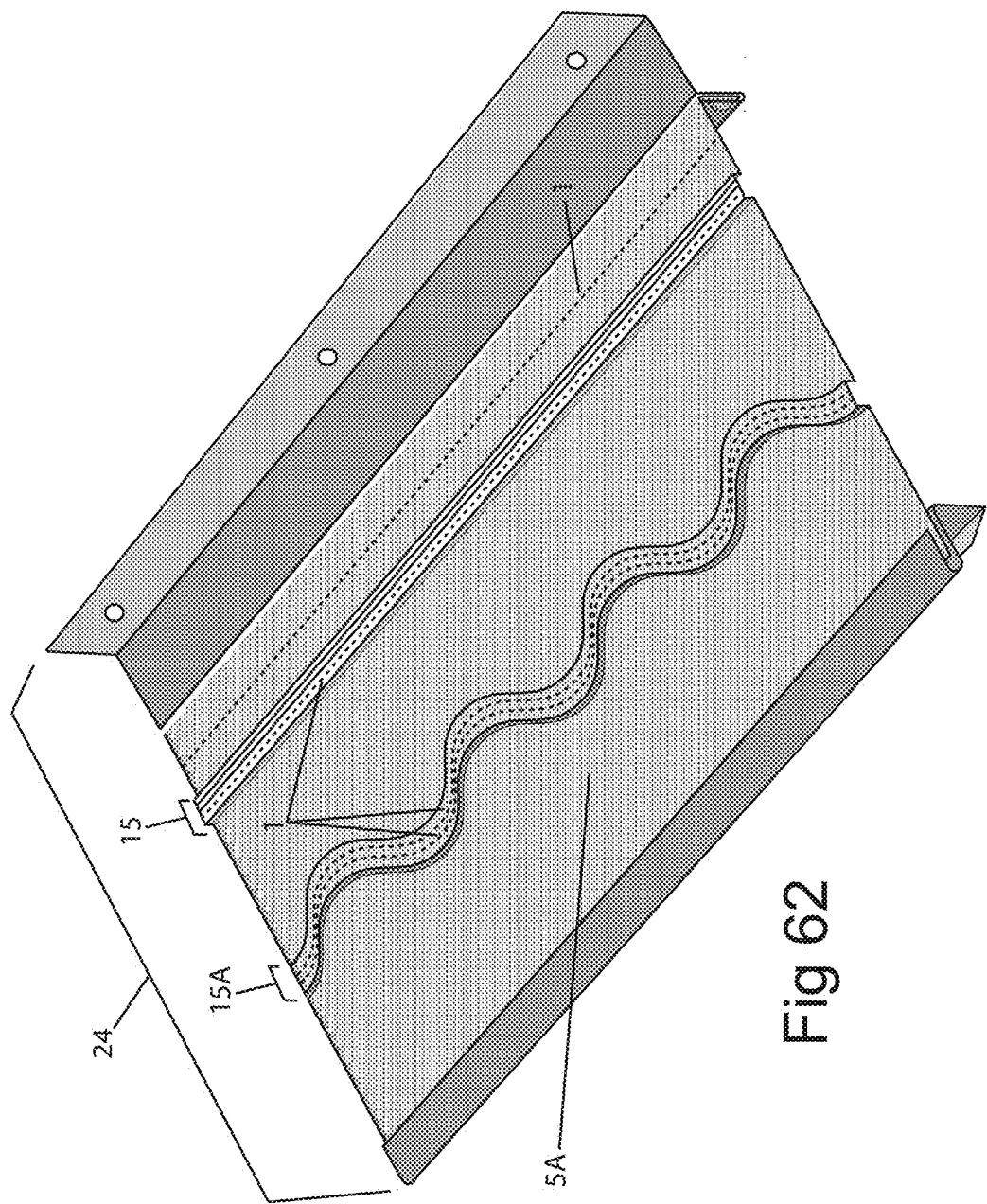
FIG. 62 is a perspective view of exemplary embodiments of the invention.

FIG. 62 shows a gutter guard 24 having a screen 5A as its water-receiving area. Present within screen 5A are a linear upward raised corrugation 15 and a shaped upward raised corrugation 15A, both of which traverse from the left to right edges of gutter guard 24. Copper threads 1 may or may not be present on the surfaces or side walls of the upraised corrugations 15, 15A. A copper thread is also shown present in a first planar portion of screen 5A preceding corrugation 15. Although illustrated traversing fully from the left to the right edge of screen 5A, one or both of corrugations 15, 15A can traverse in any direction over any portion of screen 5A.

FIG. 57 shows a gutter guard 12 having an expanded metal or screen overlay 13 overlaying downward extending channel 12A. FIG. 58 is an enlarged view of a section 12B of gutter guard 12 that shows screen 5A having notched areas 5C that receive extending ends 13G of a screen overlay 13A. Extending ends 13G can be bent around as a way of securing screen overlay 13A to underlying screen 5A. FIG. 57 shows that screen overlay 13 can include any pattern of threads or wires including but not limited to patterns 13B, 13C, 13D, 13E, 13F shown. Screen overlay 13 may be positioned in any direction and on any portion of gutter guard 12.

FIG. 59 shows gutter guard 12 having a screen underlay 13H that underlays water receiving screen 5A of gutter guard 12. FIG. 60 is an enlarged view of a portion 12B of gutter guard 12 showing screen underlay 13H having a downward extending channel 13J surrounding downward extending channel 12A of water receiving screen 5A. Adhesive can be used to attach screen underlay 13H to the underside of screen 5A or downward extending channel 13J can be crimped onto downward extending channel 12A or screen underlay 13H can be secured by other methods.

Although a screen is shown as the underlying element 13H other elements such as, but not limited to, perforated or solid metal, tape, or caulks, may alternatively or additionally be used.

Figure 61:
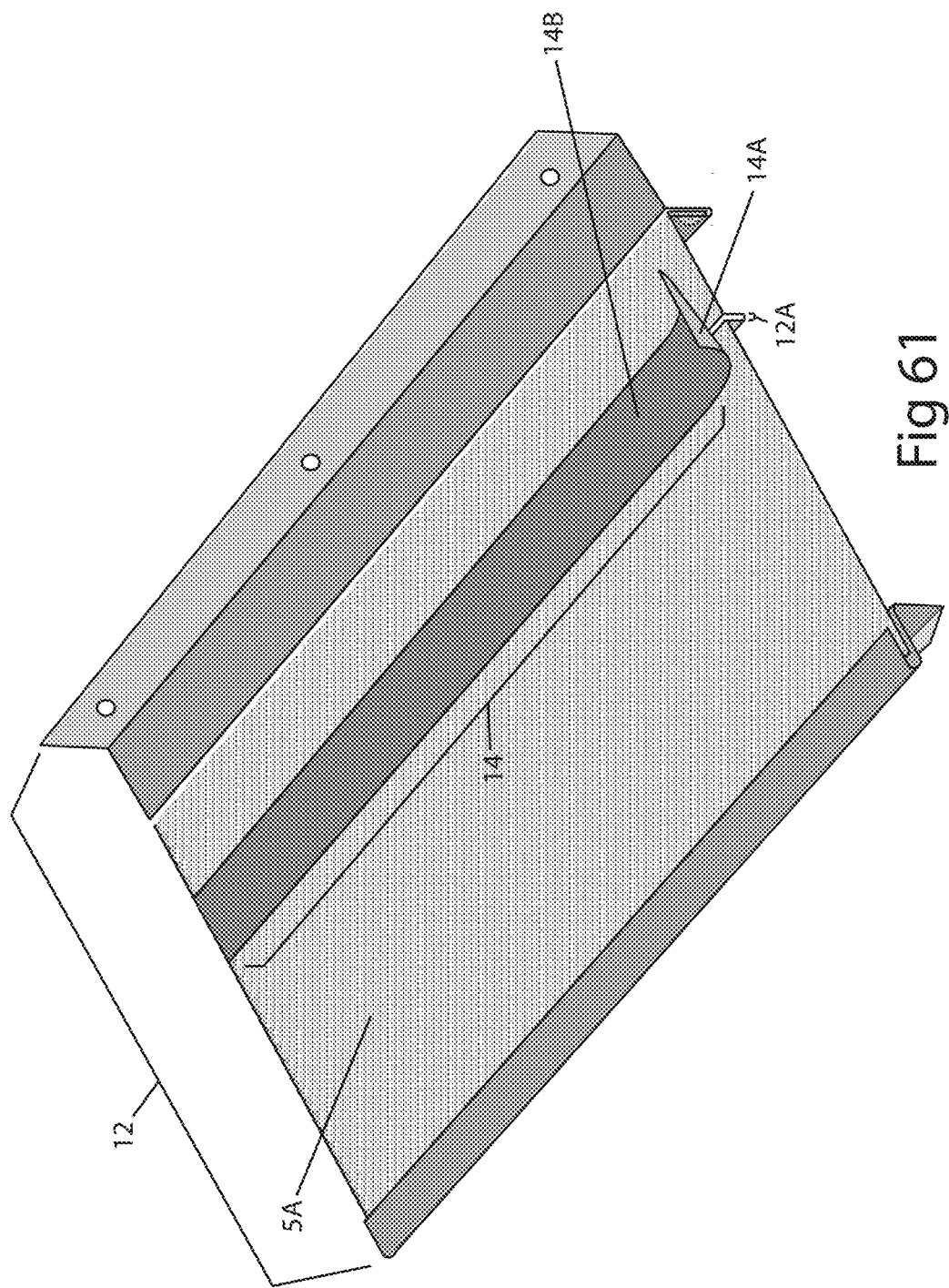
FIG. 61 is a perspective view of exemplary embodiments of the invention.

FIG. 61 shows a gutter guard 12 having a copper ribbon or tape 14 with an adhering bottom surface 14A overlying a portion of water receiving screen 5A. Tape 14 is shown having a smooth solid top surface 14B but top surface 14B can be porous and/or rough and/or have copper material or non-copper granules present that can serve to inhibit mechanical waterproofing and/or to release ions. Tape 14 can be placed on any area of gutter guard 12 or on any area of any gutter guard.

Any of the patterns, shapes, elements, or screens disclosed within this disclosure as well as any other pattern, shape or element may be utilized as elements that overlay or underlie portions of screened areas of any gutter guard or may overlay or underlie other portions of any gutter guard.

FIG. 11 shows a screen 5A having an upwardly or downwardly embossed pattern 6E embossed/pressed/formed into screen 5A which can serve as the water receiving area of a gutter guard. In FIG. 11, the particular pattern shown is that of a tire tread. Other such tire tread patterns can be used, a sampling of such patterns 17, 17A, 17B, 17C, 17D, 17E, 17E1 are illustrated in FIGS. 68-74. These types of patterns may be employed as embossments, appliques, attachments, etc., at any location on a screen, including "downstream", i.e., after a copper wire or sequence of wires or copper element or sequence of elements present within or adjacent to the body of a screen. These tire tread patterns 17, 17A, 17B, 176C, 17D, 17E, 17E1 can slow water flow and redirect water flowing over mechanically waterproofed areas downward through any open air spaces present in a screen "downstream" of mechanically water proofed areas. FIGS. 12, 13 show, respectively, the embossed pattern 6E present in the lowermost plane of recessed channel 9 present within screen 5A and on the top of raised corrugation 9A present within screen 5. These patterns can be present in select areas of a screen or may completely cover the screen and they may or may not be made of or contain copper. The patterns themselves may or may not be made of or contain copper.

Figure 66:
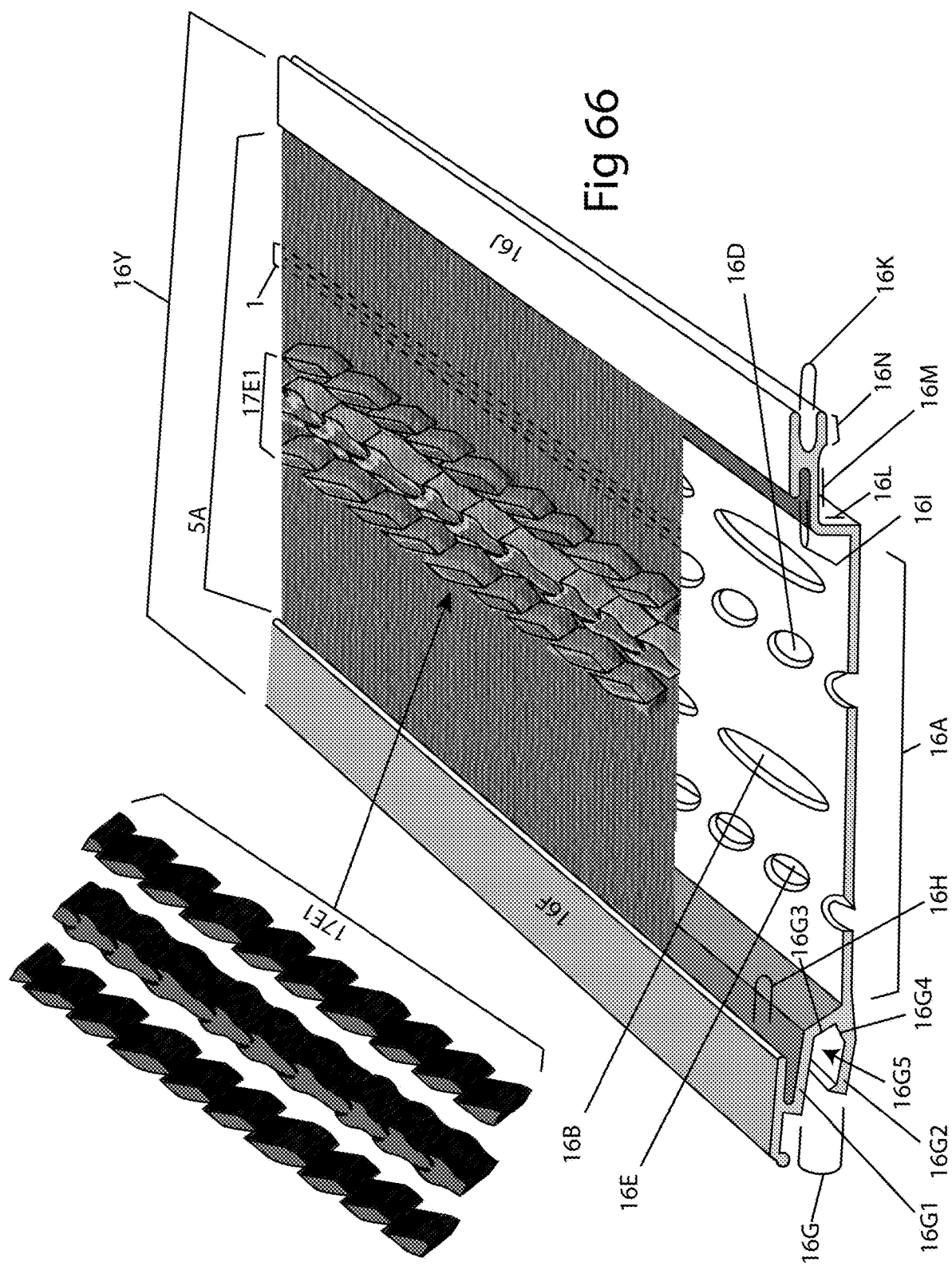
FIG. 66 is a perspective view of exemplary embodiments of the invention.

FIG. 66 shows a gutter guard 16Y having a tire tread pattern 17E1 embossed upwardly or downwardly into the body of screen 5A that overlies perforated lower plane 16A of gutter guard 16Y and that serves as the debris screening/water receiving area of gutter guard 16Y. Screen 5A is shown having copper threads 1 preceding embossed shape 17E1. The gutter guard body has T-shaped first member 16F that overlies and adjoins a modified U-shaped lower member 16G having an upper plane 16G1, a lower plane 16G2, and two rear sidewalls 16G3 and 16G4. U-shaped lower member 16G includes a channel 16G5 that is configured to receive a downward angling plane present at the rear of the top lip of some rain gutters such as, for example, K-style gutters for securing gutter guard 16Y to the top front lip of the gutter. U-shaped lower member 16G adjoins perforated plane 16A which has in a rear portion an upward extending plane 16L that adjoins a lateral plane 16M. Lateral plane 16M adjoins a T-shaped member 16J which has an extending lateral plane 16N. A receiving channel 16K is located above lateral plane 16N. Receiving channel 16K can have flat planes or various shaped elements inserted into it that enable gutter guard 16Y to be secured or adjoined or made adjacent to a fascia board of a building or that may enable the gutter guard to be secured to or rest upon the sub-roof or other structure of a building.

Figure 67:
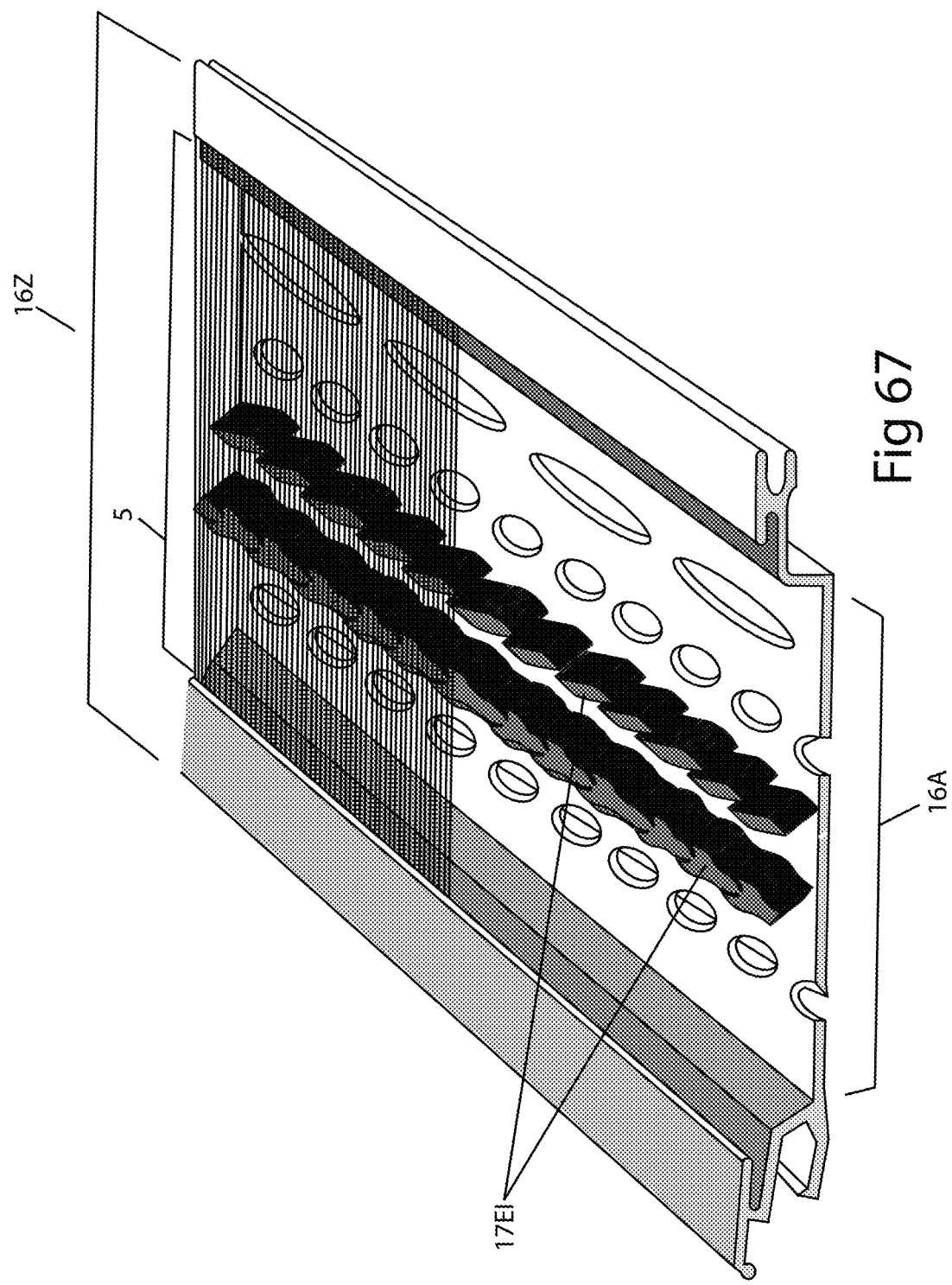
FIG. 67 is a perspective view of exemplary embodiments of the invention.

FIG. 67 shows a gutter guard 16Z having tire tread structures 17E1 rising upward from the perforated plane 16A of gutter guard 16Z. Such tire tread structures can be made of, coated with, overlain with, or contain, copper and can serve to support an overlying screen.

Figure 75:
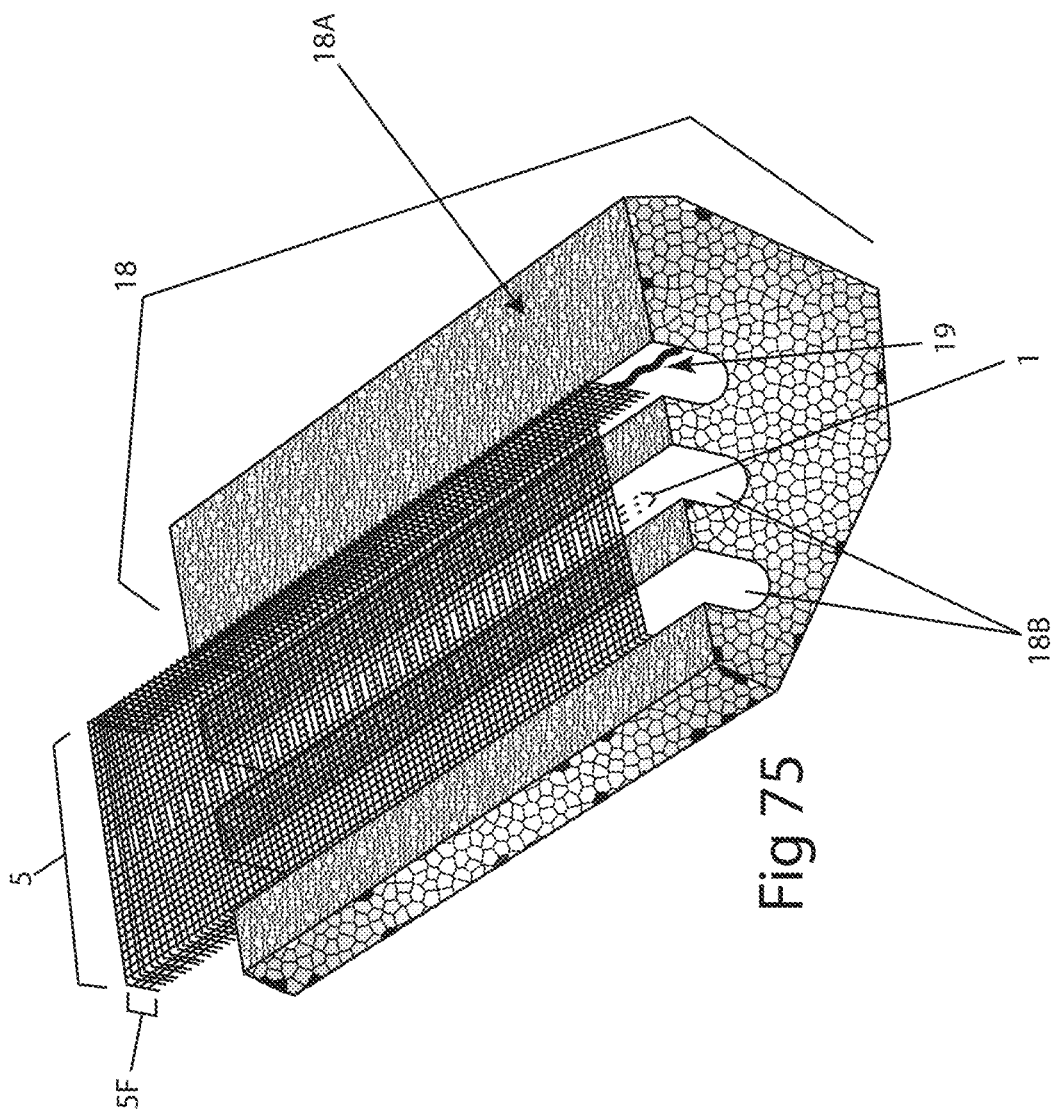
FIG. 75 is a perspective view of exemplary embodiments of the invention.
Figure 75A:
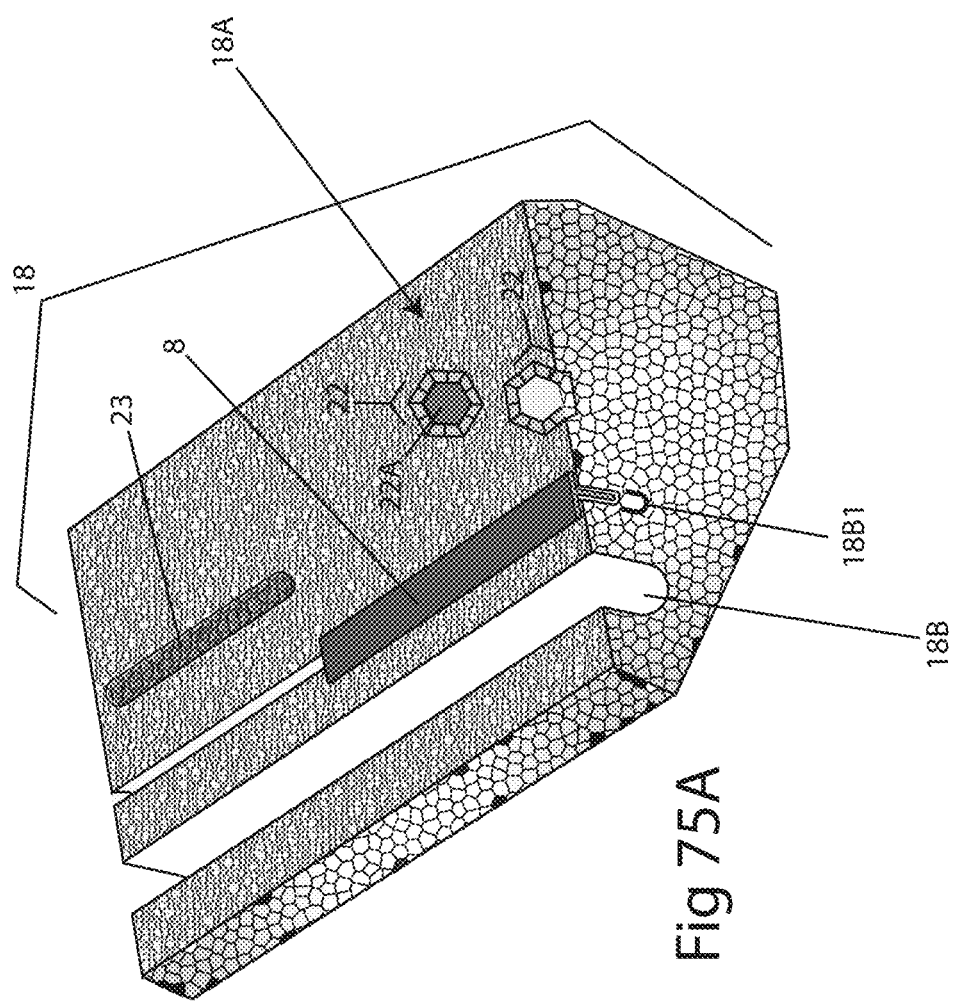
FIG. 75A is a perspective view of exemplary embodiments of the invention.

FIG. 75 shows a gutter guard 18 including a non-woven lofty fiber having channels 18B into which are inserted downward extending sides 5F of a screen 5. Channels 18B or sidewalls 5F of screen 5 can have an adhesive present to further secure screen 5 in place. FIG. 75A shows gutter guard 18 including a non-woven lofty fiber having shaped recessed wells 22 with shaped inserts 22A present in its body. Also shown is an insert 8 inserted into a narrow receiving channel 18B1 present within the body of gutter guard 18. Also shown is an area of a top surface 18A of gutter guard 18 having an area of adhesive 23 sprayed or otherwise attached or affixed to top surface 18A which can be coated with copper powder or particles that can be, for example, applied by spraying, brushing, or sprinkling. FIG. 75B shows gutter guard 18 including a non-woven lofty fiber having a copper tangled mesh type overlay 18C that can be placed upon or attached to top surface 18A by adhesion, mechanical fastening, or other fastening methods. Copper tangled mesh type overlay 18C can also be made of copper or copper and at least one other material. Copper tangled mesh 18C may alternately be comprised of non-woven-extruded-lofty-fibers that have been sprayed with adhesive and coated with copper powder or elements. As in gutter guard 18, a screen or solid element of any material, shape or configuration can be over the top or embedded within the top, or portions of the top, surface of any gutter guard's non-woven lofty fiber's top surface irrespective of any channels or other features that may or may not be present within the non-woven lofty fiber.

Figure 79:
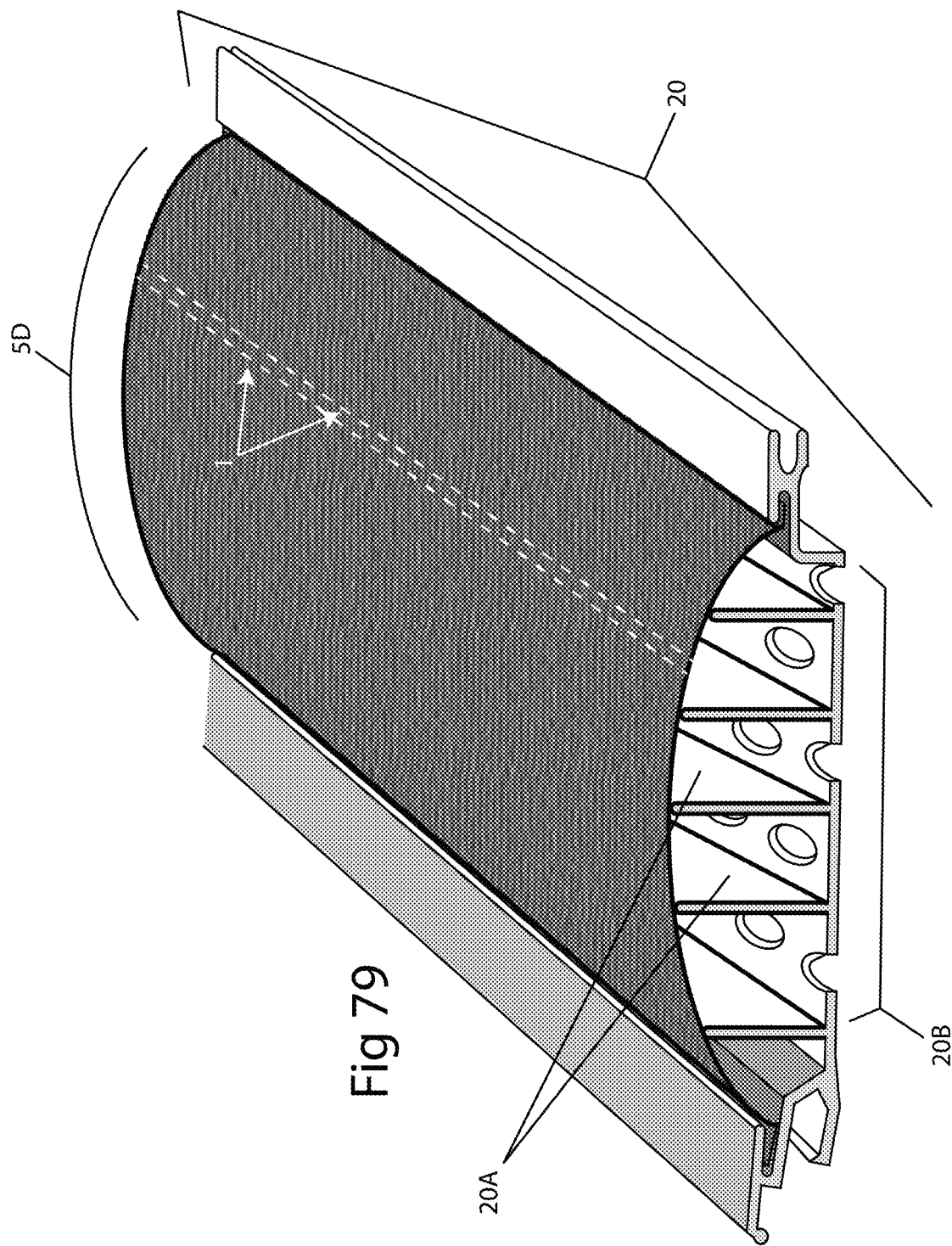
FIG. 79 is a perspective view of exemplary embodiments of the invention.

FIG. 79 shows a gutter guard 20 having upwardly raised elements 20A of a length rising upward out of a perforated lower plane 20B of gutter guard 20. Although not illustrated, the top of upwardly raised elements 20A may be flat, triangular, elongated or of any other shape and are overlain by a screen 5D that follows or mostly follows the contour created by the upwardly raised elements 20A. In this embodiment, screen 5D has copper threads 1 as shown. Screen 5D can touch or be in close proximity to the top of upwardly raised elements 20A and can deviate in direction between upwardly raised elements 20A. Although not illustrated, upwardly raised elements 20A can form a concave or flat or other dimensioned support area for overlying screen 5D.

Figure 80:
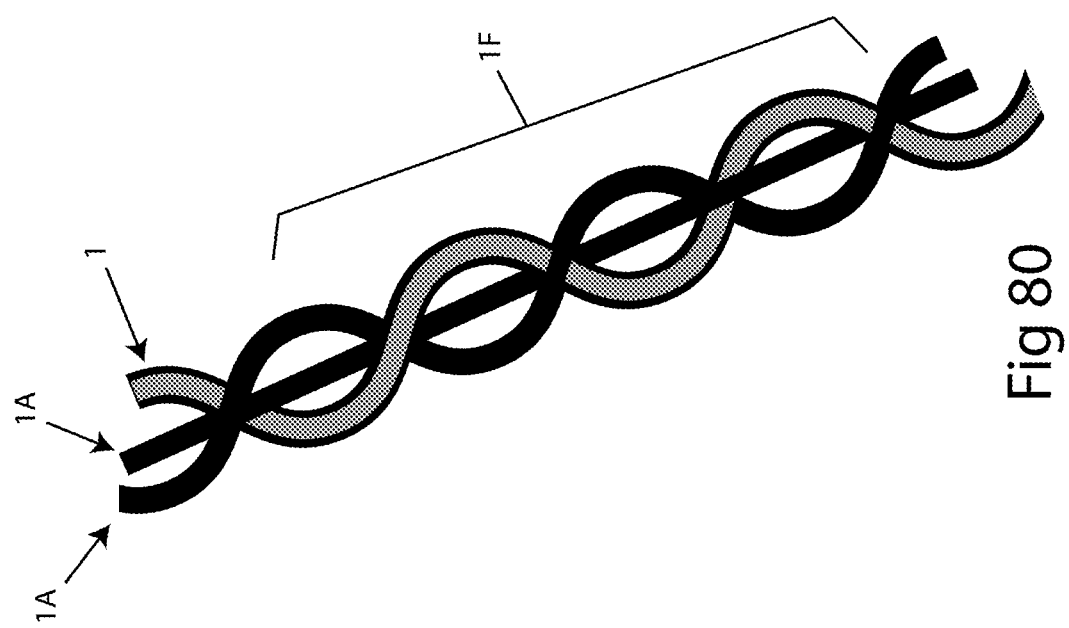
FIG. 80 is a perspective view of exemplary embodiments of the invention.

FIG. 80 shows braided wires or threads 1F. Braid 1F may be substituted for any wire in any screen in this disclosure. Braid 1F is shown having a copper wire or thread 1 interwoven or braided with stainless steel or other material wires or threads 1A. In addition to dispersing copper, braid 1F may serve some of the purposes of a corrugation such as stiffening a screen against convexing or concaving under stress when the copper thread is combined with harder threads and used as a weft or transverse directioned thread as illustrated in FIG. 77. In addition to the FIG. 77 configuration showing braid 1F in a transverse direction, braid 1F may extend in any other possible direction within or on the body of any screen. Wires that make up braid 1F may be of any count and in any proximity to one another. Braided threads can be a separate part from screen 55 but placed in close proximity over or under screen 5 and either touching or not touching screen 5.

Embodiments of the invention disclose that any screen of any construction (with or without corrugations, with or without embossed or embedded patterns or shapes, with or without intrinsically woven, threaded, knitted, or attached patterns or shapes, with or without coatings) that may or may not have copper properties in or on portions of the screen or in or on the screen in its entirety may be sized and shaped to fit over or under or in line with or be made adjacent to or attached to any part of any type of gutter guard in any direction and need not completely extend across the screen.

Embodiments of the invention disclose that any copper element or copper containing mixture, adhesive, powder, or paint may be applied to any element and area of a gutter guard.

Embodiments of the invention disclose that a wire or wires of any length and having a greater hardness or strength may be woven, or otherwise placed in or on any portion of a screen in any direction to strengthen the screen against convexing or concaving or both.

Embodiments of the invention disclose that wires of the same or mixed composition may be braided and may be woven, or otherwise placed in, on, or under any portion of a screen in any direction to strengthen the screen against convexing or concaving or both.

Embodiments of the invention disclose that non-woven lofty fiber or metallic tangled mesh screens may be comprised of threads of differing materials.

While many of the examples shown use a screen that has threads that extend in directions parallel and perpendicular to a longitudinal direction of the gutter guard or an edge of a gutter, other embodiments of the invention use a screen that has threads that extend in directions that are at an acute angle to a longitudinal direction of the gutter guard or an edge of a gutter. Some embodiments use a screen in which the threads are not orthogonal to one another. Some embodiments use a screen in which the threads are not orthogonal to one another and all threads are at an acute angle to a longitudinal direction of the gutter guard or an edge of a gutter. In some applications, screens with threads that are at an acute angle to a longitudinal direction of the gutter guard or an edge of a gutter pass more water through the screen than screens with similarly spaced threads that are parallel and perpendicular to the longitudinal direction of the gutter guard or an edge of a gutter.

While some of the examples shown group copper threads together in the screen, other examples space a single copper (or other material) thread among stainless steel (or other material) threads. In embodiments, a single (or some other number) of copper (or some other material) threads are evenly (or unevenly) spaced among a larger number of stainless steel (or other material) threads. In some applications, this can reduce the amount or existence of mechanical waterproofing.

While the foregoing description and drawings represent exemplary embodiments of the present disclosure, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made within the scope of the present disclosure. One skilled in the art will further appreciate that the embodiments may be used with many modifications of structure, arrangement, proportions, sizes, materials, and components and otherwise, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents. In addition, all combinations of any and all of the features described in the disclosure, in any combination, are part of the invention. The choice of words used for the description of an element is one of many common words that could have been chosen and thus the word is not meant to impact the intent what the element was intended to do.

What is claimed is:

1. A filtration device for filtering a fluid that passes over the filtration device, the device comprising:
   a mesh through which the fluid can pass, the mesh having a first side, a second side opposite the first side, and a plurality of intersecting members, at least a portion of the plurality of members being a first material, the plurality of intersecting members forming a plurality of uniformly formed passages that are uninterrupted from the first side to the second side, the mesh is configured to have, in use, the fluid flow through the mesh from the first side to the second side;
   a filtered fluid catching basin configured to receive the fluid that has passed though the mesh; and
   a growth inhibiting element other than the plurality of members and that is directly attached to and supported by at least one of the plurality of members at the first side of the mesh, the growth inhibiting element being a second material and being uncoated,
   wherein the second material and the first material are different materials, and
   the filtered fluid catching basin is located at the second side of the mesh.

2. The filtration device of claim 1, wherein the mesh is configured to pass the fluid in a filtered flow direction that is a different direction than a first flow direction.

3. The filtration device of claim 1, wherein the growth inhibiting element does not extend to the second side of the mesh.

4. The filtration device of claim 1, wherein the mesh has a main section that is a majority of a surface area of the top side of the mesh, and
   the main section is planar.

5. The filtration device of claim 4, wherein the mesh includes a recessed channel that extends from the bottom side of the plurality of members and has a channel surface, the channel surface being outside of the main surface plane.

6. The filtration device of claim 5, wherein the growth inhibiting element is partially located outside of the recessed channel.

7. The filtration device of claim 4, wherein the plurality of members includes a protruding feature, the protruding feature extending outside of the main surface plane, and
   the growth inhibiting element is located in the protruding feature.

8. The filtration device of claim 4, further comprising a protruding feature that extends away from the plurality of members and is outside of the main surface plane.

9. The filtration device of claim 1, wherein the mesh has a cross-sectional shape that extends above and below a plane.

10. The filtration device of claim 1, wherein the growth inhibiting element is a plurality of growth inhibiting elements that are attached to the top side of the mesh.

11. A rain gutter configured to attach to a building to separate debris from rain water flowing off a roof of the building, the gutter comprising:
a mesh through which the rain water can pass in a filtered flow direction that is through the mesh, the mesh having a first side, a second side opposite the first side, and a plurality of intersecting members, the plurality of intersecting members forming a plurality of uniformly formed passages that are uninterrupted from the first side to the second side, the mesh is configured to have, in use, the rain water flow through the mesh from the first side to the second side;
a filtered fluid catching basin configured to receive the rain water;
a growth inhibiting element directly attached to and supported by at least one of the plurality of members at the first side of the mesh, the growth inhibiting element being uncoated; and
a protrusion extending from at least one of the plurality of members,
wherein the plurality of members are a material other than the growth inhibiting material, and
the filtered fluid catching basin is located at the second side of the mesh.

12. The gutter of claim 11, wherein the protrusion is a recessed channel that extends from the bottom side of the mesh.

13. The gutter of claim 12, wherein the growth inhibiting element is at least partially located in the protrusion.

14. The gutter of claim 11, wherein the mesh has a planar section that is a portion of the top side of the mesh, the planar portion extending along a plane, and
the growth inhibiting element is non-linear in a plane that is parallel to the planar section.

15. A method of filtering a fluid, the method comprising:
passing the fluid through apertures in a mesh, the mesh having a top side, a bottom side, and a plurality of intersecting members, the plurality of intersecting members forming the apertures as uniformly formed passages that are uninterrupted from the top side to the bottom side; and
catching the fluid that has passed through the apertures in the mesh in a filtered fluid catching basin,
wherein one of the members is made of a first material and another of the members is made of a second material,
the second material is an uncoated growth inhibiting material,
the second material and the first material are different materials,
a protrusion extends from one of the top side and the bottom side, the protrusion including members of the plurality of members, and
the filtered fluid catching basin is located at the bottom side of the mesh.

16. The method of claim 15, further comprising:
passing the fluid over the member made of the second material as the fluid flows along a first flow path; and
passing the fluid through the apertures after the fluid has passed over the member made of the second material,
wherein when the fluid flows through the apertures, the fluid flows along a second flow path that is non-parallel to first flow path.

17. The method of claim 16, wherein the mesh has a planar portion that extends along a plane that is positioned parallel to the first flow path.

18. The method of claim 17, wherein the member made of the second material is in the planar portion.

19. The method of claim 15, wherein the fluid contacts a protrusion extending from the mesh.

20. The filtration device of claim 1, wherein the growth inhibiting element is located away from first and second edges of the mesh,
at least a second one of the plurality of members is between the growth inhibiting element and the first edge,
at least a third one of the plurality of members is between the growth inhibiting element and the second edge, and
the first edge is opposite to the second edge.

21. The method of claim 15, further comprising:
passing the fluid over the member made of the second material as the fluid flows along a flow path; and
passing the fluid through the apertures after the fluid has passed over the member made of the second material,
wherein the member made of the second material is located away from first and second edges of the mesh,
at least a second one of the members made of the first material is between the member made of the second material and the first edge,
at least a third one of the members made of the first material is between the member made of the second material and the second edge, and
the first edge is upstream from the second edge in a direction of the flow path.

22. The gutter of claim 11, wherein the growth inhibiting element is located outside of the protrusion.

* * * * *